United States Patent
Preciado et al.

(10) Patent No.: US 12,487,072 B2
(45) Date of Patent: Dec. 2, 2025

(54) BAND-PASS SAMPLING IN A SWEPT SOURCE OPTICAL COHERENCE TOMOGRAPHY IMAGING SYSTEM TO EXTEND IMAGING RANGE

(71) Applicant: OPTOS PLC, Dunfermline (GB)

(72) Inventors: Miguel Angel Preciado, Dunfermline (GB); Lijo Varughese Chacko, Dunfermline (GB)

(73) Assignee: OPTOS PLC, Dunfermline (GB)

( * ) Notice: Subject to any disclaimer, the term of this patent is extended or adjusted under 35 U.S.C. 154(b) by 0 days.

(21) Appl. No.: 17/233,672

(22) Filed: Apr. 19, 2021

(65) Prior Publication Data

US 2021/0348912 A1    Nov. 11, 2021

(30) Foreign Application Priority Data

Apr. 23, 2020   (EP) ................................... 20171060

(51) Int. Cl.
   *G01B 9/02*      (2022.01)
   *A61B 3/10*      (2006.01)
   (Continued)

(52) U.S. Cl.
   CPC .......... *G01B 9/02091* (2013.01); *A61B 3/102* (2013.01); *G01B 9/02004* (2013.01);
   (Continued)

(58) Field of Classification Search
   CPC ............ G01B 9/02091; G01B 9/02004; G01B 9/02043; G01B 9/02069; G01B 9/02084;
   (Continued)

(56) References Cited

U.S. PATENT DOCUMENTS

| 6,947,147 B2 * | 9/2005 | Motamedi .......... G01M 11/3109 356/73.1 |
| 10,488,178 B2 | 11/2019 | Bouchard |

(Continued)

FOREIGN PATENT DOCUMENTS

JP    2015-114284 A    6/2015

OTHER PUBLICATIONS

European Search Report issued Nov. 10, 2020 in relation to European patent application No. 20 171 060.5.(6 sheets).

(Continued)

*Primary Examiner* — Hwa Andrew Lee

(57) ABSTRACT

A swept-source OCT imaging system for imaging a region of an object, comprising: a swept light source which generates a beam of varying wavelength; a scanning element which scans the beam across the object; an interferometer which generates interference light by combining light scattered by the object (owing to the scan) with reference light; a photodetector which generates an electrical signal (S) having frequency components spanning a frequency band and caused by interference of the scattered light with the reference light; a band-pass filter module which band-pass filters the electrical signal; and a sample acquisition module which samples the filtered electrical signal. The band-pass filter module extracts at least some of the frequency components spanning the frequency band from the electrical signal. The sample acquisition module band-pass samples the filtered electrical signal.

20 Claims, 16 Drawing Sheets

(51) Int. Cl.
   *G01B 9/02004* (2022.01)
   *G01B 9/02055* (2022.01)
   *G01B 9/02091* (2022.01)
   *G01N 21/47* (2006.01)

(52) U.S. Cl.
   CPC ..... *G01B 9/02043* (2013.01); *G01B 9/02069* (2013.01); *G01B 9/02084* (2013.01); *G01N 21/4795* (2013.01)

(58) Field of Classification Search
   CPC ............... G01B 9/02028; G01B 9/02083; A61B 3/102; A61B 3/0025; A61B 5/0066; G01N 21/4795
   See application file for complete search history.

(56) References Cited

U.S. PATENT DOCUMENTS

| | | | | |
|---|---|---|---|---|
| 2009/0244547 | A1* | 10/2009 | Ozawa | G01B 9/02091 356/511 |
| 2011/0102802 | A1* | 5/2011 | Izatt | G01B 9/0201 356/479 |
| 2012/0095323 | A1* | 4/2012 | Eskandari | A61B 5/0051 600/595 |
| 2014/0268038 | A1 | 9/2014 | Schmoll | |
| 2014/0340689 | A1* | 11/2014 | Namati | G01B 9/02091 356/479 |
| 2016/0252340 | A1* | 9/2016 | Hollenbeck | G01B 9/02004 356/479 |
| 2017/0122722 | A1* | 5/2017 | Raymond | A61B 3/102 |
| 2018/0226773 | A1 | 8/2018 | Yun et al. | |
| 2019/0128659 | A1* | 5/2019 | Wang | G01B 9/02004 |
| 2019/0290117 | A1* | 9/2019 | Wang | G01B 9/02041 |

OTHER PUBLICATIONS

Davis A. M., Choma M. A. and Izatt J. A. "Heterodyne swept-source Optical Coherence Tomography for complete complex conjugate ambiguity removal." Journal of Biomed Optics, 10(6):064005, (2005), pp. 064005-1 to 064005-6.

Huang D., Li Y., Tang M. "Anterior Eye Imaging with Optical Coherence Tomography." Drexler W., Fujimoto J. (eds) Optical Coherence Tomography., Tech. and Applications, Second Edition, vol. 3, pp. 1649-1683 (2015), Springer, Reference, Cham. https://doi.org/10.1007/978-3-319-06419-2_57.

Notice of Reasons for Rejection mailed Mar. 29, 2022 in Japanese patent application No. 2021-071183 (4 sheets). (English translation attached; 3 sheets).

* cited by examiner

|  | $\varphi = 0°$ | $\varphi = 20°$ | $\varphi = 40°$ | $\varphi = 60°$ |
|---|---|---|---|---|
| $\theta = 0°$ | PB (0, 0)<br>Fs (0, 0) | PB (0, 20)<br>Fs (0, 20) | | |
| $\theta = 20°$ | | ... | | |
| $\theta = 40°$ | | | ... | |
| $\theta = 60°$ | | | | PB (60, 60)<br>Fs (60, 60) |

Fig. 12

BAND-PASS SAMPLING IN A SWEPT SOURCE OPTICAL COHERENCE TOMOGRAPHY IMAGING SYSTEM TO EXTEND IMAGING RANGE

CROSS REFERENCE TO RELATED APPLICATION

This application claims the benefit of priority based on European Patent Application EP 20 171 060.5 filed Apr. 23, 2020, which is hereby incorporated by reference in its entirety as if set forth fully herein.

TECHNICAL FIELD

Example aspects herein generally relate to the field of optical coherence tomography (OCT) imaging systems and, more specifically, to a swept source OCT imaging system.

BACKGROUND

Swept source OCT is a form of Fourier domain OCT, by which a reflectivity depth profile of the retina or other part of an eye can be obtained through Fourier analysis of a detected interference signal. This well-established technique has been used in a variety of different fields, for example in the medical field for ocular imaging, intravascular imaging, oncology (e.g. laparoscopic OCT, endoscopic OCT and bronchoscopic OCT), dermatology (to image skin tissue) and dentistry, among others. Swept source OCT also has various non-medical applications, such as non-destructive testing (NDT), material thickness measurements (e.g. thickness measurement of semiconductor wafers), surface roughness characterization, surface and cross-section imaging and volume loss measurements, for example.

FIG. 1 is a schematic illustration of a conventional ophthalmic swept-source OCT imaging system that is used to image a retina of an eye. The illustrated swept-source OCT imaging system has an interferometer which comprises a swept light source 10, a beam splitter 20, a reference mirror 30, a scanning element 40, a photodetector 50, and a sample acquisition module 60. A light beam generated by the swept light source 10 is split into two beams by the beam splitter 20, with a first of the beams being guided along a reference arm of the interferometer to the reference mirror 30, and a second of the beams being guided along a sample arm of the interferometer towards a retina of an eye 70 of a subject. The scanning element 40 is controlled to direct the light beam 80 in the sample arm to a target scan region 90 of the eye 70, and guide backscattered light from the eye 70 back into the interferometer. The back-reflected light travelling along the reference arm and the sample arm are then combined at the photodetector 50 to generate an interference light signal. The wavelength of the light produced by the swept light source 10 (which is typically provided in the form of a tunable laser or other light source having a narrow linewidth) is rapidly swept over a range of wavelengths for each scan location in the target scan region 90, and the generated interference light signal is detected by the photodetector 50 during the sweep. The output of the photodetector 50, i.e. an interferogram 95, as schematically illustrated in FIG. 1, is sampled by the sample acquisition module 60, and an inverse Fourier transform of the sampled electric signal is then calculated to obtain A-scan data, which provides information on the structure of the retina in the depth direction. An A-scan can thus be acquired using a single wavelength sweep, for each scan location in the target scan region 90.

SUMMARY

There is provided, in accordance with a first example aspect herein, a swept-source optical coherence tomography, OCT, imaging system for imaging a region of an object, the system comprising a swept light source arranged to generate a beam of light of a wavelength which varies over time and a scanning element arranged to scan the beam of light across the object. The swept-source OCT imaging system further comprises an interferometer having a sample arm and a reference arm, and arranged to generate an interference light signal during use of the swept-source OCT imaging system by combining light scattered by the region of the object and propagating along the sample arm, as a result of the beam being scanned across the object, with light from the beam propagating along the reference arm. The swept-source OCT imaging system further comprises a photodetector arranged to receive the interference light signal and generate an electrical signal that is indicative of the interference light signal, the electrical signal comprising frequency components spanning a frequency band, wherein the frequency components are caused by interference of the light scattered by the region of the object and propagating along the sample arm, with the light from the beam propagating along the reference arm. The swept-source OCT imaging system further comprises a band-pass filter module arranged to generate a filtered electrical signal by band-pass filtering the electrical signal, and a sample acquisition module arranged to acquire samples of the filtered electrical signal. The swept source OCT imaging system comprises a control module arranged to set a pass band of the band-pass filter module such that the bandpass filter module extracts at least some of the frequency components spanning the frequency band from the electrical signal, the control module being further arranged to set a sampling rate of the sample acquisition module such that the sample acquisition module band-pass samples the filtered electrical signal to acquire a set of samples of the filtered electrical signal for generating OCT image data representing an image of the region of the object.

DESCRIPTION OF THE DRAWINGS

Example embodiments will now be explained in detail, by way of non-limiting example only, with reference to the accompanying figures described below. Like reference numerals appearing in different ones of the figures can denote identical or functionally similar elements, unless indicated otherwise.

FIG. 12 illustrates a non-limiting example of a look-up table which can be used to determine the pass band of the bandpass filter module and the sampling rate of the sample acquisition module based on the scan angle of light illuminating the region of the eye.

DETAILED DESCRIPTION OF EXAMPLE EMBODIMENTS

Figure 1:
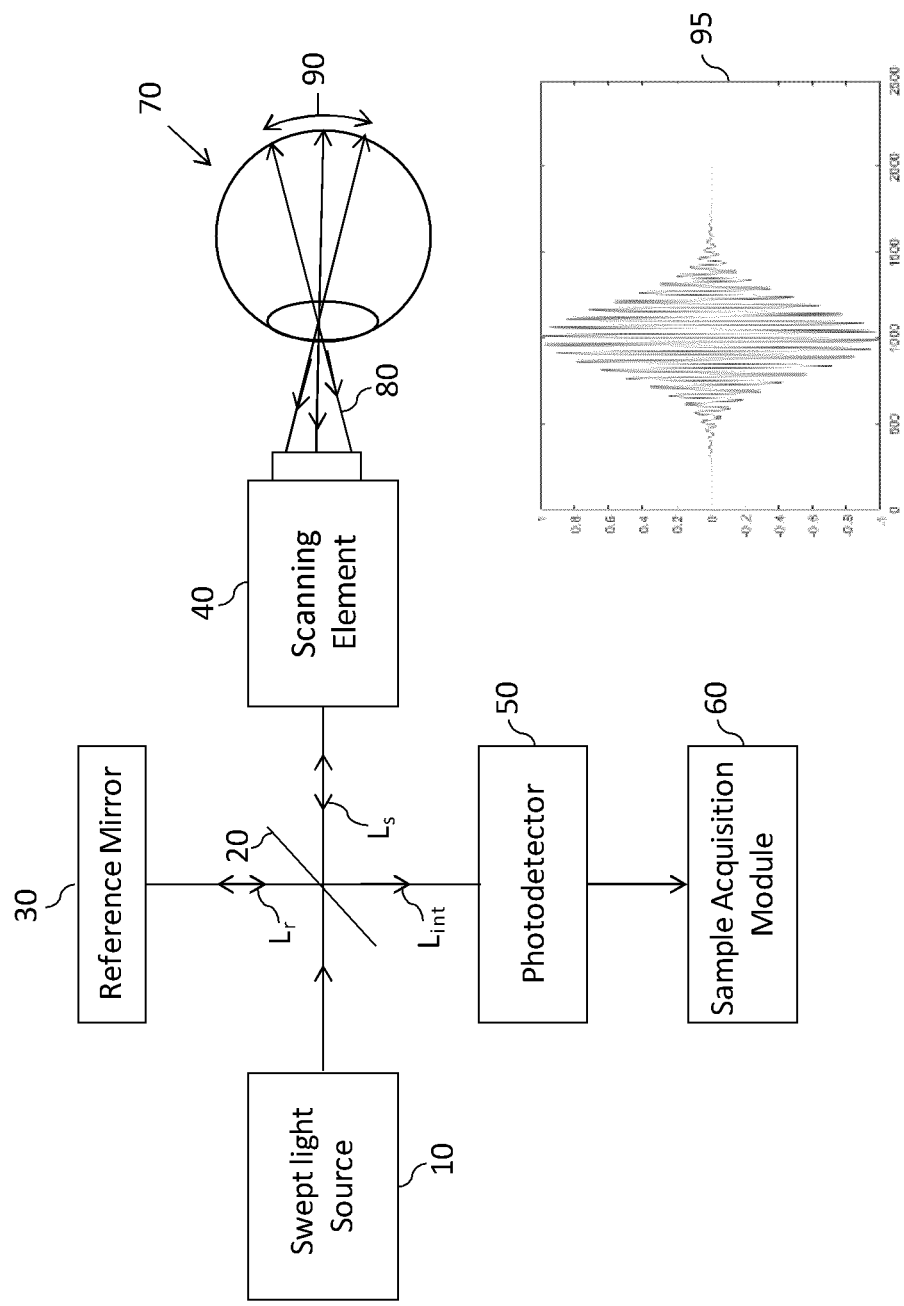
FIG. 1 is a schematic illustration of a conventional ophthalmic swept-source OCT imaging system.

In a conventional swept-source OCT imaging system as described above with reference to FIG. 1, the frequency of the interferogram 95 is directly proportional to an optical path difference between the light in the sample arm and the light in the reference arm of the interferometer. Furthermore, as the frequency of the swept light source 10 increases into the megahertz range, the frequencies in the resulting interferogram 95 scale proportionally.

Although the highest frequency signal that can be acquired depends in part on the bandwidth of the photodetector 50 and the coherence length of the swept light source 10, the sampling rate of the sample acquisition module 60 is often the limiting factor in practice. As the frequency of the interferogram 95 increases, the maximum sampling rate of the sample acquisition module 60 effectively limits the maximum depth of the retina or other structure in the eye 70 that can be imaged. In addition, due to the limitations in the maximum sampling rate of the sample acquisition module 60, it is often not possible to acquire samples of the interferogram 95 in accordance with the Nyquist criterion, namely, at a rate which is at least twice the highest frequency component contained in the interferogram 95.

Figure 2:
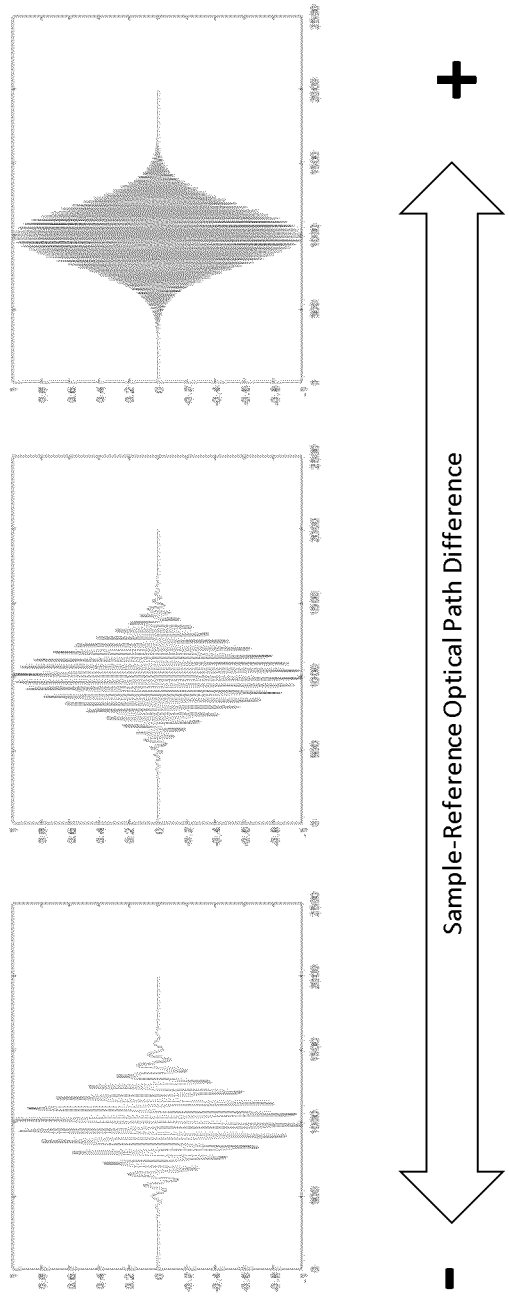
FIG. 2 illustrates three different interferograms based on electrical signals generated by a photodetector of a conventional ophthalmic swept-source OCT system.

FIG. 2 illustrates three different interferograms measured by the photodetector 50 of the conventional swept-source OCT imaging system of FIG. 1. The horizontal axis in each interferogram represents wavenumber, while the vertical axis represents the power of the interference light signal detected by the photodetector 50. The interferograms in FIG. 2 were obtained for different respective values of the optical path difference between light propagating in the reference arm and the light in the sample arm, which increase from left to right in FIG. 2. As illustrated in FIG. 2, a larger optical path difference results in an interferogram having a higher frequency of oscillation along the wavenumber axis. For an interferogram having a single frequency signal (corresponding to interference caused by a single retinal layer), the frequency of the interferogram may be proportional to a product of the wavelength sweep rate of the swept light source 10 and the optical path difference between the reference arm and the sample arm.

Conventionally, to reduce the frequency of the interferogram 95 to be detected, the reference arm is typically adjusted to reduce the relative delay between the sample arm signal and the reference arm signal, by moving the reference mirror 30. However, the mechanical mirror moving mechanism employed for this purpose cannot allow the optical path difference to be adjusted instantaneously, and this limitation leads to delays in the image capturing process. In light of this problem, the present inventor has recognised/discovered that the high-frequency components of the interference signal detected by the photodetector 50 can be acquired by using bandpass sampling (also known as under-sampling) to effectively frequency-translate a band pass signal detected by the photodetector that is caused by reflected OCT-light from a target region in the eye, to the first Nyquist zone before processing the samples to determine the depth profile.

Figure 3A:
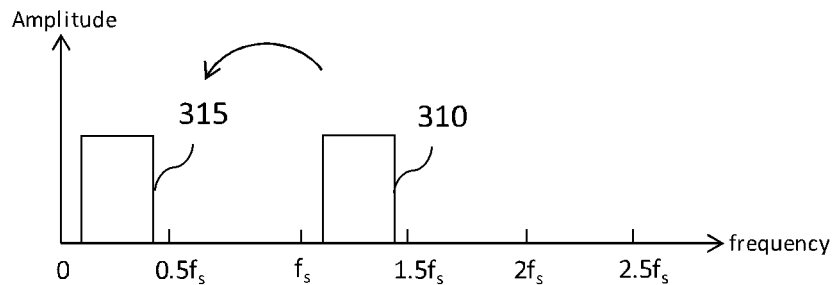
FIG. 3a illustrates a first problem identified herein that arises when under-sampling an electrical signal detected by a photodetector in a swept-source OCT imaging.

FIGS. 3a to 3d are schematic spectral diagrams illustrating some practical challenges that have been found to arise when under-sampling a swept-source OCT interference light signal that is detected by a photodetector. In FIG. 3a, a signal 310 in a third Nyquist zone is the signal of interest that resulted from OCT light reflected by a target region 90 within the eye 70. When undersampling the signals in FIG. 3a at a rate of fs, signal 310 will alias with signal 315 in a first Nyquist zone, meaning that the depth profile corresponding to signal 310 cannot be correctly determined from the acquired samples. FIG. 4 further illustrates the effects of aliasing in an OCT image when the signal detected by the photodetector is under-sampled. The X-direction in FIG. 4 defines the transverse direction of the scan (i.e. along the surface of the retina) while the Z-direction defines the axial/depth direction of the eye 70 (i.e. along the propagation direction of the light beam). In FIG. 4, the high frequency components corresponding to a deeper region of the eye 70 are aliased onto the lower frequency components (corresponding to a "shallower" region) and aliasing also occurs at the Nyquist frequency due to critical sampling.

Figure 3B:
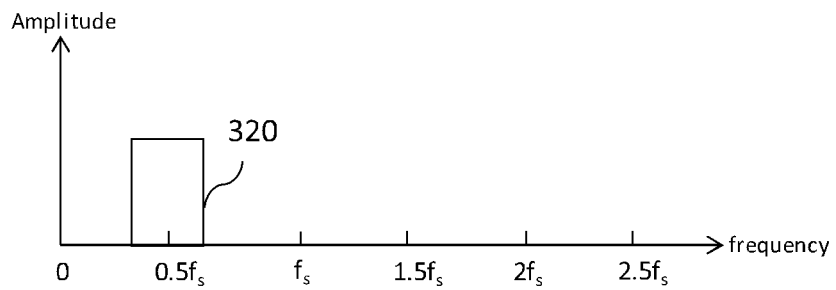
FIG. 3b illustrates a second problem identified herein that arises when under-sampling an electrical signal detected by a photodetector in a swept-source OCT imaging.
Figure 3C:
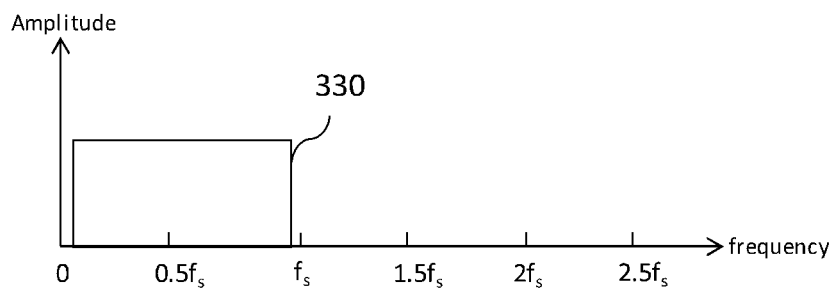
FIG. 3c illustrates a third problem identified herein that arises when under-sampling an electrical signal detected by a photodetector in a swept-source OCT imaging.
Figure 3D:
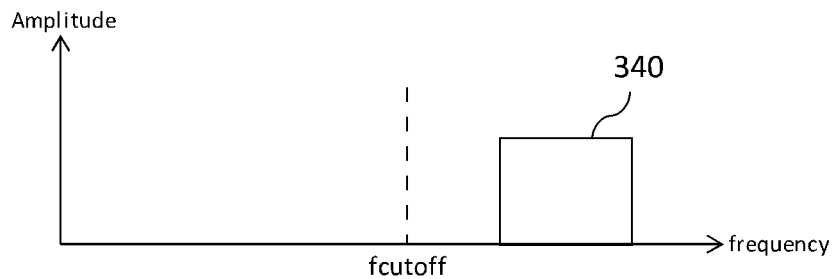
FIG. 3d illustrates a fourth problem identified herein that arises when under-sampling an electrical signal detected by a photodetector in a swept-source OCT imaging.
Figure 4:
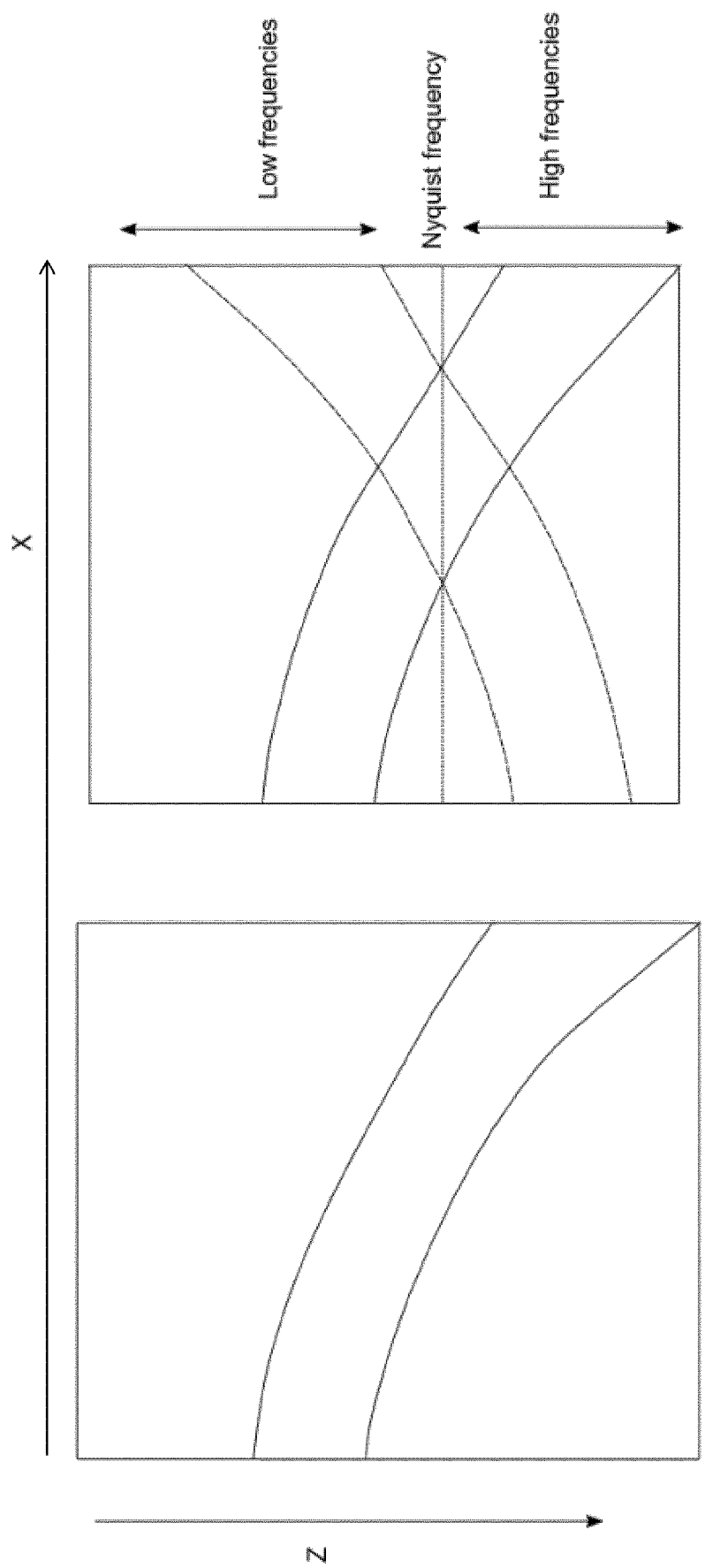
FIG. 4 illustrates the effects of aliasing in an OCT image when an electrical signal detected by the photodetector of a conventional ophthalmic swept-source OCT system is under-sampled.

FIG. 3b illustrates an example where the band-pass signal 320 lies between two Nyquist zones. In this scenario, when signal 320 is under-sampled at a rate of fs, the portion of signal 320 in a second Nyquist zone will alias with the portion of signal 320 in the first Nyquist zone. A similar problem occurs in the example of FIG. 3c, where the bandwidth of signal 330 exceeds the size of a Nyquist zone for a given sampling rate. In this case, aliasing is unavoidable. FIG. 3d illustrates an example where the frequency of the interference light signal generated by the interferometer exceeds the cut-off frequency of the photodetector and therefore cannot be acquired by the photodetector 50.

To overcome the limitation in maximum imaging range imposed by the limitation in sampling rate, a tunable anti-aliasing filter module is employed in example embodiments herein to select different frequency components in the detected electrical signal that correspond to different regions in the depth direction of the eye 70. Furthermore, a sample acquisition module having an adjustable sampling rate is used to acquire samples of the filtered electrical signal using a sampling rate that is based on the frequency band of interest, in order for samples to be acquired in accordance with bandpass sampling criterion. In this manner, during a retinal scan, for example, high-frequency components in the electrical signal resulting from retinal layers at greater depths can effectively be "wrapped" into the first Nyquist zone, thus significantly relaxing the requirements on sampling rate of the sample acquisition module. Swept-source OCT imaging system(s) according to at least some example embodiments described herein thus employ band-pass sampling to acquire a reflectivity profile for retinal depths that would otherwise not be measurable owing to limitations imposed (at least in part) by the maximum sampling rate of the sample acquisition module 60.

In the case where the size of the region along the axial direction of the eye 70 results in a pass band signal having a bandwidth that exceeds half of the maximum sampling rate of the sample acquisition module 60, a filter bank may be employed to separate the signal into sub-bands and acquire samples of the signal in each sub-band using an appropriate sampling rate in accordance with the band-pass sampling theorem.

Furthermore, while the band-pass sampling allows high-frequency signals generated by the photodetector to be acquired, this solution does not overcome the problem where the optical path-delay between the reference arm and the sample arm is great enough to cause an interference light signal having frequency components that lie above the cut-off frequency of the photodetector (defined as the frequency at which the output current of the photodetector decreases by 3 dB from the low frequency response). To overcome this limitation imposed by the photodetector, the inventor has discovered, and there is described in the following, a way of performing fast adjustment of the path-delay, using an optical switch to select between one of a plurality of optical delay lines, each having a different optical delay.

Another benefit of a swept-source OCT imaging system according to at least some of the example embodiments herein is to allow the acquisition of OCT image scans in which at least some image artefacts caused by a curvature of the retina within the imaged region are suppressed or eliminated. This is particularly relevant for ultra-wide field (UWF) OCT scans.

Example embodiments will now be explained in detail, with reference to the accompanying drawings.

Figure 5:
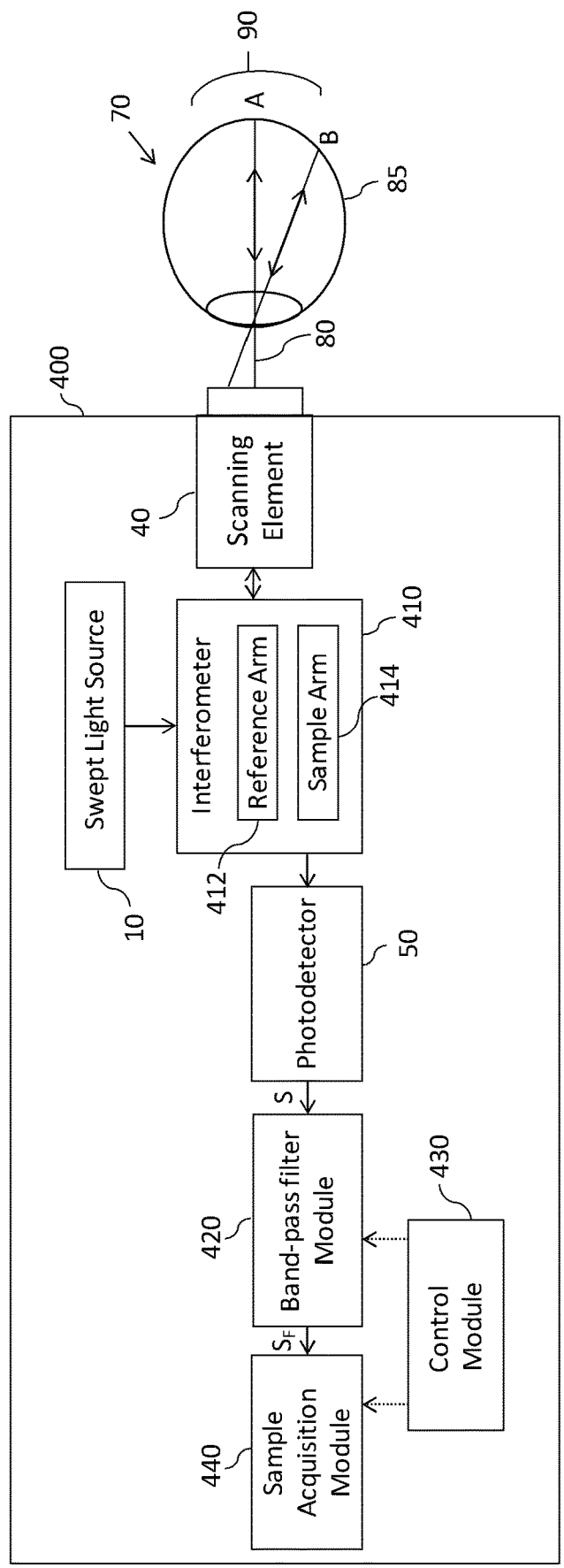
FIG. 5 is a schematic illustration of an ophthalmic swept-source OCT imaging system according to a first example embodiment herein.
Figure 6:
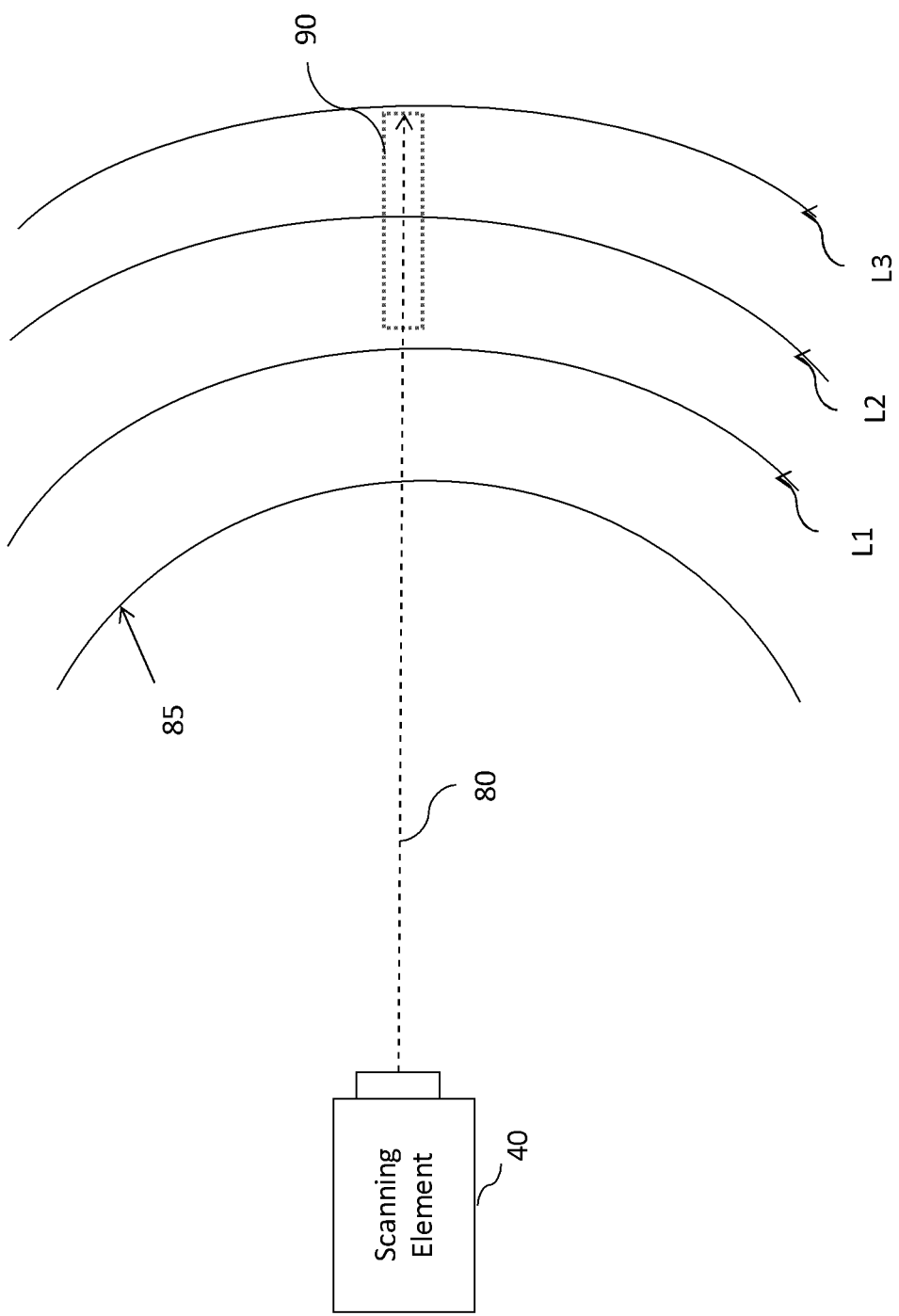
FIG. 6 illustrates a region of an eye in the form of a cross-section of the retina that can be imaged by the ophthalmic swept-source OCT imaging system of FIG. 5.

FIG. 5 is a schematic illustration of an ophthalmic swept source OCT (SS-OCT) imaging system 400 for imaging a region 90 of an eye 70 according to a first example embodiment herein. FIG. 6 illustrates the region 90 of the eye 70 that can be imaged by the swept-source OCT imaging system 400 in FIG. 5, and also shows the scanning element 40 of the system 400 and beam 80 of light (also referred to herein as a "light beam 80"). As shown in FIG. 6, the region 90 of the eye 70 may, as in the present example embodiment, be a cross-section of a retina 85 of the eye 70. Furthermore, the region 90 may, as in the present example embodiment, extend along an imaging axis of the swept-source OCT system 400 in the depth direction of the eye 70 (that is, along a propagation direction of the beam 80 of light incident on the eye 70 during use of the ophthalmic swept-source OCT imaging system 400), henceforth defined as the axial direction of the eye 90.

As illustrated in FIG. 5, the ophthalmic swept-source OCT imaging system 400 comprises a swept light source 10 arranged to generate a beam 80 of light of a wavelength which varies over time. The swept light source 10 may, as in the present example embodiment, output substantially monochromatic light while the wavelength of the monochromatic light is swept across a range of wavelength values. The ophthalmic swept-source OCT imaging system also has the scanning element 40 operable to scan the beam 80 of light across the eye 70.

The ophthalmic swept-source OCT imaging system 400 further comprises an interferometer 410 having a sample arm 414 and a reference arm 412. The interferometer 410 is arranged to generate an interference light signal (the light interference signal being labelled $L_{int}$ in FIG. 1) during use of the ophthalmic swept-source OCT imaging system 400 by combining light from the swept light source 10, which has been scattered by the eye 70 and is propagating along the sample arm 414 (this light being labelled $L_s$ in FIG. 1), with light from the swept light source 10 that is propagating along the reference arm 412 (this light being labelled $L_r$ in FIG. 1).

The ophthalmic swept-source OCT imaging system 400 further comprises a photodetector 50 that is arranged to receive the interference light signal and generate an electrical signal that is indicative of the interference light signal. The electrical signal comprises frequency components spanning a frequency band which are caused by interference of the light from the swept light source 10 which has been scattered by the region 90 of the eye 70 with the light from the swept light source 10 that is propagating along the reference arm 412. For example, the electrical signal may, as in the present example embodiment, be indicative of a power of the interference signal measured by the photodetector 50.

The ophthalmic swept-source OCT imaging system 400 further comprises a band-pass filter module 420 arranged to generate a filtered electrical signal by band-pass filtering the electrical signal. The ophthalmic swept-source OCT imaging system 400 further comprises a sample acquisition module 440 arranged to acquire samples of the filtered electrical signal.

In addition, the ophthalmic swept-source OCT imaging system 400 comprises a control module 430 arranged to set a pass band of the band-pass filter module 420 such that the band-pass filter module 420 extracts at least some of the frequency components spanning the frequency band from the electrical signal S. The control module 430 is further arranged to set a sampling rate of the sample acquisition module 440 such that the sample acquisition module 440 band-pass samples the filtered electrical signal $S_F$ to acquire a set of samples of the filtered electrical signal $S_F$ for generating OCT image data representing an image of the region 90 of the eye 70.

Figure 7:
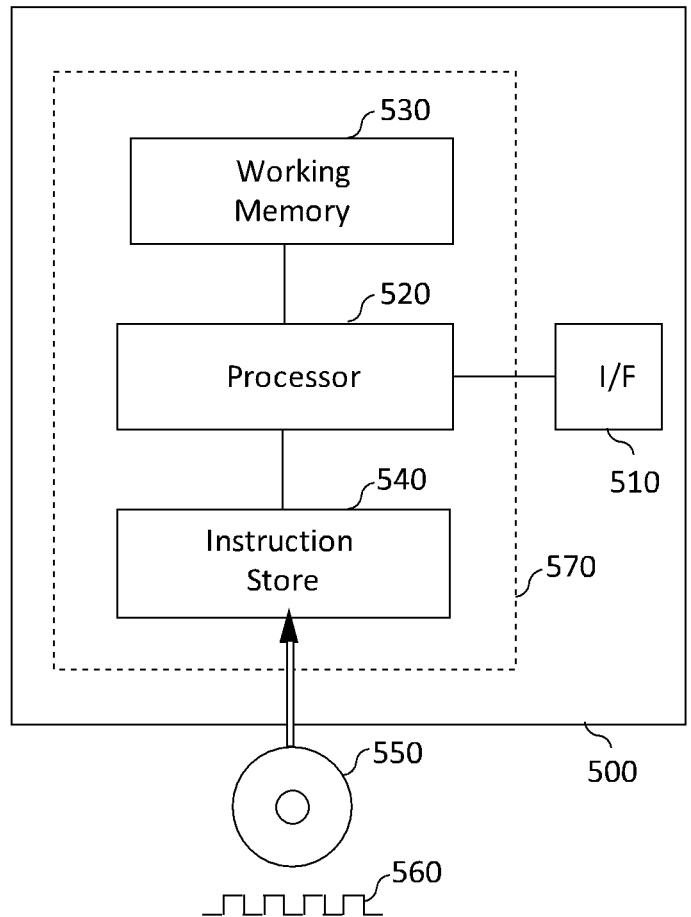
FIG. 7 shows an example hardware implementation of a control module in the first example embodiment.

FIG. 7 shows an example implementation of a signal processing apparatus 500 of an example embodiment herein, in the form of programmable signal processing hardware. In one example embodiment herein, the signal processing apparatus 500 can form the control module 430 of FIG. 5. The signal processing apparatus 500 comprises an interface module 510, which, in a case where the apparatus 500 forms the control module 430, is for outputting a filter control signal to the band-pass filter module 420 (FIG. 5) to set its pass band and outputting a sampling control signal to the sample acquisition module 440 (FIG. 5) to set its sampling rate. The signal processing apparatus 500 further comprises a processor (CPU/FPGA) 520 for controlling the overall apparatus 500 (and control module 430, in the case there the apparatus 500 forms the control module 430), a working memory 530 (e.g. a random access memory) and an instruction store 540 storing a computer program comprising computer-readable instructions which, when executed by the processor 520, cause the processor 520 to perform the processing operations of the apparatus 500 (and control module 430). The instruction store 540 may comprise a ROM (e.g. in the form of an electrically-erasable programmable read-only memory (EEPROM) or flash memory) which is pre-loaded with the computer-readable instructions. Alternatively, the instruction store 540 may comprise a RAM or similar type of memory, and the computer-readable instructions can be input thereto from a computer program product, such as a computer-readable storage medium 550 such as a CD-ROM, etc. or a computer-readable signal 660 carrying the computer-readable instructions.

In the present example embodiment, the combination of the hardware components shown in FIG. 7, comprising the processor 520, the working memory 530 and the instruction store 540, is arranged to implement the functionality of the control module 430.

Figure 8:
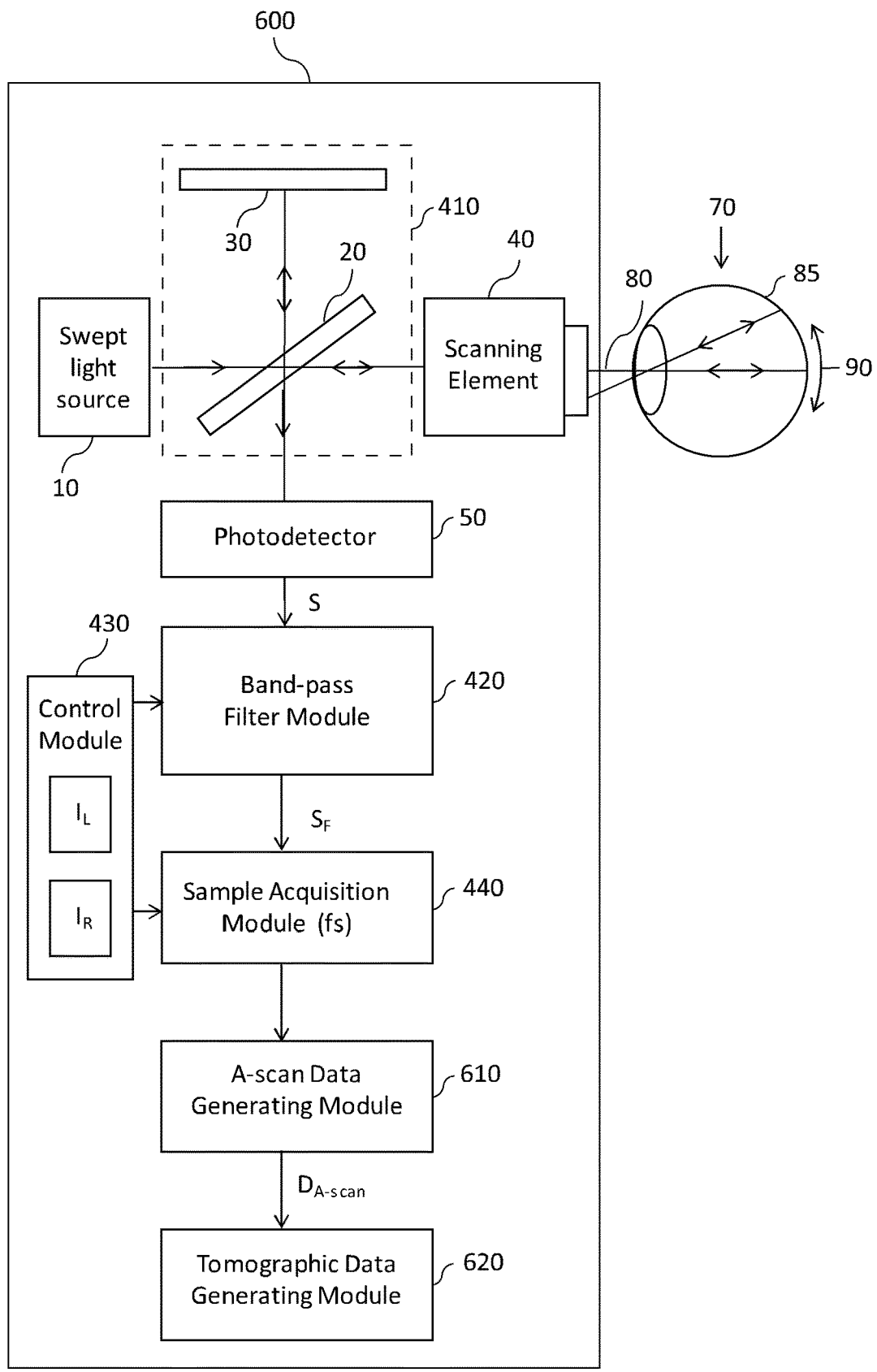
FIG. 8 is a schematic illustration of a first example implementation of the ophthalmic swept-source OCT imaging system according to the first example embodiment.

FIG. 8 is a schematic showing an example implementation of the ophthalmic swept-source OCT (SS-OCT) imaging system 600 according to the first example embodiment, wherein the system 600 includes the same components as the system 400 of FIG. 5, and also includes an A-scan data generating module 610 and a tomographic data generating module 620. In FIG. 8, the swept light source 10 is arranged to perform, for each A-scan measurement location of one or more A-scan measurement locations, a sweep of the wavelength of the output light across a range of wavelengths. The swept light source 10 thus outputs light whose wavelength changes over time. Denoting the wavenumber of the light output by the swept light source 10 at time t by k(t), the wavenumber k(t) is swept linearly and can be written as $k(t)=k_0+\delta k \times t$, wherein $k_0$ is a starting wavenumber at the start of the sweep, and $\delta k=\Delta k/\Delta t$ is a rate at which the wavenumber of the output light is swept, wherein $\Delta k$ is the range over which the wavenumber changes during the sweep, and $\Delta t$ is the duration of the sweep. The linewidth of the swept light source 10 (i.e. a width, such as a full width at half-maximum (FWHM), of the spectrum of light generated by the swept light source 10) determines the coherence length of the light and therefore the imaging depth of the swept-source OCT imaging system 600, while the wavelength/wavenumber sweep range determines axial resolution.

The ophthalmic swept-source OCT imaging system 600 of FIG. 8 further comprises scanning element 40 that is operable to scan the light beam 80 across the region 90 of the eye 70. The scanning element 40 may, as in the present example embodiment, take the form of a two-mirror scanner arrangement comprising an H-galvanometer mirror and a V-galvanometer mirror, which are provided in an optical arrangement that scans the light beam 80 in a horizontal direction and a vertical direction onto the retina 85. The two galvanometer mirrors forming the scanning element 40 may be rotated by respective motors, for example, under the control of a controller of the swept-source OCT imaging system 600 (not shown) so as to vary the optical path of the light beam 80 and therefore vary the location on the retina 85 that is imaged. In the present example embodiment, the scan angle of the light beam 80 scanned into the eye 70 depends on the inclination angles (θ, φ) of the H-galvanometer mirror and the V-galvanometer mirror, wherein angle θ is an inclination angle of the H-galvanometer mirror and angle φ is an inclination angle of the V-galvanometer mirror. The inclination angles θ and φ respectively indicate the degree of rotation of the H-galvanometer mirror and the V-galvanometer mirror about their respective axes of rotation. Although the scanning element 40 of the present example embodiment employs two scanning mirrors, another configuration of one or more scanning elements may be used, such as, for example, a single scanning mirror that is rotatable about two orthogonal axes.

The interferometer 410 may, as in the present example embodiment of FIG. 8, further comprise an optical coupler/beam splitter 20, which is arranged to split the light from the swept light source 10 into two beams, and direct a first of the beams into the reference arm 412 (FIG. 5), which, in one example embodiment herein, comprises the reference mirror 30 (FIG. 8), and direct a second of the beams into the sample arm 414 (FIG. 5). For example, the light emitted from the swept light source 10 may be fed into an optical coupler (e.g., splitter 20) via a first optical fiber, and be split into reference light and signal light. The reference light may be guided to the reference arm 412 (comprising mirror 30) via a second optical fiber, while the signal light may be guided to the scanning element 40 via a third optical fiber.

In the reference arm 412, the reference mirror 30 returns the reference light to the optical coupler 20 via the same optical path along the reference arm 412, by reflecting the reference light. The reference mirror 30 may, as in the present example embodiment, be a movable mirror that is moveable in the direction of the optical axis of the reference light, such that the length of the optical path of the reference light can be adjusted by moving the position of the reference mirror 30 along the optical axis. However, it is to be noted that the reference mirror 30 is maintained in a fixed position for each A-scan measurement.

One or more light guiding components (not shown) may be used to direct light from the scanning element 40 into the eye 70. By example and without limitation, the light guiding components may be one or more mirrors and/or lenses arranged to guide the light from the scanning element 40 into the eye 70. Furthermore, the scanning element 40 of the present example embodiment is arranged to guide light from the sample arm 414, which has been scattered by the retina (herein referred to as 'sample arm return light'), to the optical coupler 20 via a fourth optical fiber (not shown).

The sample arm 414 return light propagating along the sample arm 414 is superimposed with the reference light propagating along the reference arm 412 at the photodetector 50.

The photodetector 50 may, as in the present example embodiment, generate an electrical signal based on the intensity of the interference light signal detected thereby. As an example, for a region 90 of the eye 70 having N retinal layers, each layer having a depth $z_n$ from the surface the retina, photodetector current $I_D(k)$ of the photodetector 50 for wavenumber k is given by:

$$I_D(k) \propto S(k) \Sigma_{n=1}^{N} \sqrt{R_n R_R} (\cos 2k\, z_n), \quad (1)$$

where S(k) is the optical power spectral density of the swept light source 10 defined as a function of wavenumber k. $R_n$ is the reflectivity of the n-th retinal layer, and $R_R$ is the reflectivity of the reference mirror 30. A plot of the detected intensity of the interference light signal over time corresponds to an interferogram of the kind shown schematically in FIG. 2.

The electrical signal detected by the photodetector 50 is therefore indicative of the power of the interference light signal and therefore the intensity of the interference light signal. In the present example embodiment, the photodetector 50 takes the form of a balanced photodetector comprising two photodiodes connected in series so that the photocurrent of each photodiode is subtracted from each other. However, the photodetector 50 may alternatively take the form of any standard point detector.

In FIG. 8, while the wavelength of the swept light source 10 is being swept, the power of the interference light is repeatedly detected by the photodetector 50, and corresponding values of the electrical signal are generated by the photodetector 50. The respective value of the electrical signal generated by the photodetector 50 for each wavelength of a plurality of wavelengths covered by the sweep is indicative of the reflectance profile of the retina for that wavelength. As explained in relation to FIGS. 1 and 2, the electrical signal comprises frequency components that result from backscattered light from different layers of the retina 85, with deeper layers giving rise to higher frequency components.

In FIG. 8, the electrical signal generated by the photodetector 50 is provided to the band-pass filter module 420, which may, as in the present example embodiment, be arranged to generate the filtered electrical signal $S_F$ by extracting the frequency components of the electrical signal in the frequency band and substantially attenuating signals outside the frequency band. However, in other embodiments, the band-pass filter module 420 may not be arranged to extract the frequency components across the whole of the frequency band, but may instead extract frequency components only in a sub-band of the frequency band.

In FIG. 8, the sample acquisition module 440 is arranged to acquire a set of samples of the filtered electrical signal for generating OCT image data representing an image of the region 90 of the eye 70. In the present embodiment, the sample acquisition module 440 is arranged to acquire, as the set of samples, samples of the electrical signal in the frequency band by band-pass sampling the electrical signal in the frequency band. More specifically, for a frequency band that has a center frequency $f_c$ and a bandwidth of B, band-pass sampling refers to the selection of a sampling rate $f_s$ in accordance with the following criteria:

$$\frac{2f_c - B}{n} \geq f_s \geq \frac{2f_c + B}{n+1} \quad (2)$$

wherein n is any positive integer that ensures the Shannon-Nyquist criterion of $f_s > 2B$ is satisfied for the selected sampling rate $f_s$.

By selecting the sampling rate $f_s$ in accordance with the band-pass sampling theorem defined in equation (2), aliasing is avoided as the signal in the frequency band can be frequency-translated into the first Nyquist zone without overlapping with the spectral images of the band-pass signal that are caused by sampling. Although equation (2) is presented using specific variables, it should be noted that the band-pass sampling theorem can also be presented differently using different variables (such as the upper bound and the lower bound of the frequency band which the band-pass signal spans) and still represent the same theorem.

It should be noted that, although the band-pass sampling theorem above indicates that a band-pass signal can be accurately sampled and reconstructed by selecting any $f_s$ that satisfies the criterion in equation (2), additional implementation constraints may exist due to non-ideal band-pass filters and instabilities of a sample rate clock generator being used. More particularly, since an ideal band-pass filter (i.e. a Sin c filter or a brick-wall filter) cannot be realised in practice, the transition bands (the band between the pass band and the stop band) of the band-pass filter module 420 need to be taken into account when selecting $f_s$. Selecting a lower sampling rate $f_s$ may require the band-pass filter module 420 to have a steeper roll-off in its transition bands in order to ensure that signal content in an adjacent Nyquist zone does not alias onto the signal in the frequency band of interest.

In the present example embodiment, to ensure that a guard band exists between Nyquist boundaries and the spectral images of the signal in the frequency band of interest after band-pass sampling, the maximum and minimum terms for $f_s$ in equation (2) are not used for a particular value of n. This is because setting $f_s$ to the maximum term for $f_s$ in equation (2) will lead to the spectral images of the signal in the frequency band to directly abut the Nyquist boundaries at integer multiples of $f_s$. Furthermore, setting $f_s$ to the minimum term for $f_s$ in equation (2) will lead to the spectral images of the signal in the frequency band to directly abut Nyquist boundaries at $0.5f_s$, $1.5f_s$, $2.5f_s$ etc. Accordingly, the control module 430 may, as in the present example embodiment, provide the sampling control signal to cause the sample acquisition module 440 to acquire samples of the signal in the frequency band using a sampling rate $f_s$ that is the average of the maximum and minimum sampling rates in equation (2), for a given value of n, more specifically:

$$f_s = \frac{1}{2}\left[\frac{2f_c - B}{n} + \frac{2f_c + B}{n+1}\right] \quad (3)$$

By setting the sampling rate in accordance with equation (3), a guard band can be created on either side of each spectral image of the signal. Any aliasing occurring in the guard band does not distort the signal of interest and therefore allows the filter constraints to be relaxed so that a filter with a higher roll-off factor can be used. However, it should be noted that the sampling rate $f_s$ is by no means limited to the specific formula in equation (3). Rather, any intermediate value between the maximum and minimum terms in equation (2) would allow for the spectral images of the signal in the frequency band to be moved away from the Nyquist boundaries and therefore provide a guard band against aliasing. In some example embodiments, the sampling control signal may cause the sample acquisition module 440 to acquire samples at a sampling rate of:

$$f_s = \frac{4f_c}{m} \quad (4)$$

for any positive, odd integer that allows $f_s>2B$ to be satisfied. Using a sampling rate of $f_s$ as defined in equation (4) allows the under-sampled signal in the first Nyquist zone to be centred at $0.25f_s$. Setting the sampling rate in accordance with equation (4) is advantageous as it allows any spectral inversion of the original spectrum to be corrected in a straightforward manner. More specifically, when n is selected to be an odd integer in equation (2) (equivalent to when $f_s$ is selected such that the signal of interest is located in an even numbered Nyquist zone (i.e. the $2^{nd}$, $4^{th}$, $6^{th}$ Nyquist zones . . . etc)), the under-sampled signal that is frequency-shifted into the first Nyquist zone will be spectrally inverted such that it will have the same spectral shape as the negative spectrum of the original signal. In cases where the spectrum of the signal in the frequency band of interest is not symmetric about its center frequency, additional processing needs to be performed on the acquired samples in order correct for the spectral inversion. When the samples are acquired using the sampling rate in equation (4), the resulting spectrum of the under-sampled signal is centred at $0.25f_s$, and spectral inversion can be correctly by multiplying the acquired time-domain samples by a sequence of alternating plus ones and minus ones, alternating plus ones and minus ones (1, −1, 1, −1, etc.) which can be denoted as $(-1)^p$, where p is the number of time domain discrete samples. Multiplying the discrete time samples by $(-1)^p$ causes the spectrum of the under-sampled signal in the first Nyquist zone to be spectrally inverted about $0.25f_s$. This causes the spectrum of the under-sampled signal in the first Nyquist zone to have the same spectral orientation as the spectrum of the original signal in the frequency band of interest.

In some example embodiments, the sample acquisition module 440 may be arranged to sample at a sampling rate of:

$$f_s = \frac{2f_c - B}{l} \quad (5)$$

for any positive, even integer that allows $f_s>2B$ to be satisfied. Setting the sampling rate in accordance with equation (5) ensures that the under-sampled signal in the first Nyquist zone has the same orientation as the original signal in the frequency band of interest. This therefore avoids additional processing required for correcting spectral inversion.

Returning to FIG. 8, the band-pass filter module 420 may, as in the present example embodiment, comprise a tunable band-pass filter having a pass band with a tunable center frequency. The control module 430 is arranged to set the pass band of the band-pass filter module 420 by adjusting the center frequency of the pass band based on a location indicator $I_L$ which is indicative of a location of the region 90 along a propagation direction of the beam 80 of light incident on the eye 70 during use of the ophthalmic swept-source OCT imaging system 600 to acquire the set of samples of the filtered electrical signal for generating the OCT image data representing the image of the region 90 of the eye 70. The location indicator $I_L$ that is indicative of the location of the region may be provided to the control module 430, or may alternatively be determined by the control module 430. For example, the control module 430 may derive the location indicator $I_L$ based on a region of the eye selected by the user for imaging, or identified through a feature detection algorithm.

By using a tunable band-pass filter (for module 420) that is capable of adjusting its pass band, frequency components of the detected electrical corresponding to different regions in the depth direction of the eye 70 can be obtained. For a band-pass filter having a lower cut-off frequency of $f_L$ and an upper cut-off frequency of $f_H$ (corresponding to the −3 dB cut-off frequencies at which the filter output drops by −3 dB from its maximum gain value), the center frequency $f_c$ may, as in the present case, be defined the arithmetic mean of $f_L$ and $f_H$ but may in some cases be calculated as the geometric mean of the two terms. The bandwidth of the filter is defined as the difference between the two cut-off frequencies, $f_H-f_L$, and the pass band of the band-pass filter is defined as the frequency range between $f_L$ to $f_H$.

In some example embodiments, the tunable band-pass filter may alternatively or additionally have a tunable bandwidth, and the control module 430 may be further arranged to set the pass band of the band-pass filter module 420 by adjusting the bandwidth of the tunable band-pass filter based on a range indicator $I_R$ which is indicative of a size of the region 90 along the propagation direction of the beam 80 of light. As the frequency components of the electrical signal depend on the distribution of reflecting layers of the retina, the bandwidth of the band-pass filter defines a range along the axial direction (or propagation direction of the light beam) of the swept-source OCT system for which a depth profile can be obtained, this range being set based on the range indicator $I_R$. Accordingly, by setting a higher bandwidth for the tunable band-pass filter via a corresponding value of the range indicator $I_R$, reflectivity information from a larger cross-section of the eye 70 can be extracted. In addition, using a tunable band-pass filter with an adjustable bandwidth allows the filter to pass only the frequency components of the electrical signal which are caused by light reflected from the region of interest, thereby allowing for a reduced sampling rate to be used to perform band-pass sampling of the filtered electrical signal.

The implementation of the tunable band-pass filter 420 is not limited, and may take one of many different forms known to those skilled in the art. For example, the tunable band-pass filter may, as in the present example embodiment, take the form of a tunable planar filter that employs tunable MEMS capacitor as a tuning element to adjust the pass band of the filter. However, any suitable tunable filter implementation may be used, such as, for example, a cavity filter, surface acoustic wave filter, passive LC filter, or an active filter. Furthermore, instead of the MEMS capacitor, another suitable tuning element may be used, such as, for example, a digitally tunable capacitor, a Yttrium Iron Garnet ferrimagnet or varactor diode.

Although the band-pass filter module 420 in the present example embodiment comprises a tunable band-pass filter, the band-pass filter module 420' of an alternative example embodiment may instead comprise a plurality of non-tunable band-pass filters each having a different pass band with different center frequencies. The control module 430 may in that case be arranged to set the pass band of the bandpass filter module 420' by selecting a non-tunable band-pass filter from among the plurality of non-tunable band-pass filters to band-pass filter the electrical signal S to generate the filtered electrical signal $S_F$. In one example embodiment herein, the selecting is performed based on the location indicator $I_L$ which is indicative of a location of the region 90 along a propagation direction of the beam 80 of light incident on the eye 70 during use of the ophthalmic swept-source OCT imaging system 600 to acquire the set of samples of the filtered electrical signal for generating the OCT image data representing the image of the region 90 of the eye 70.

Figure 9:
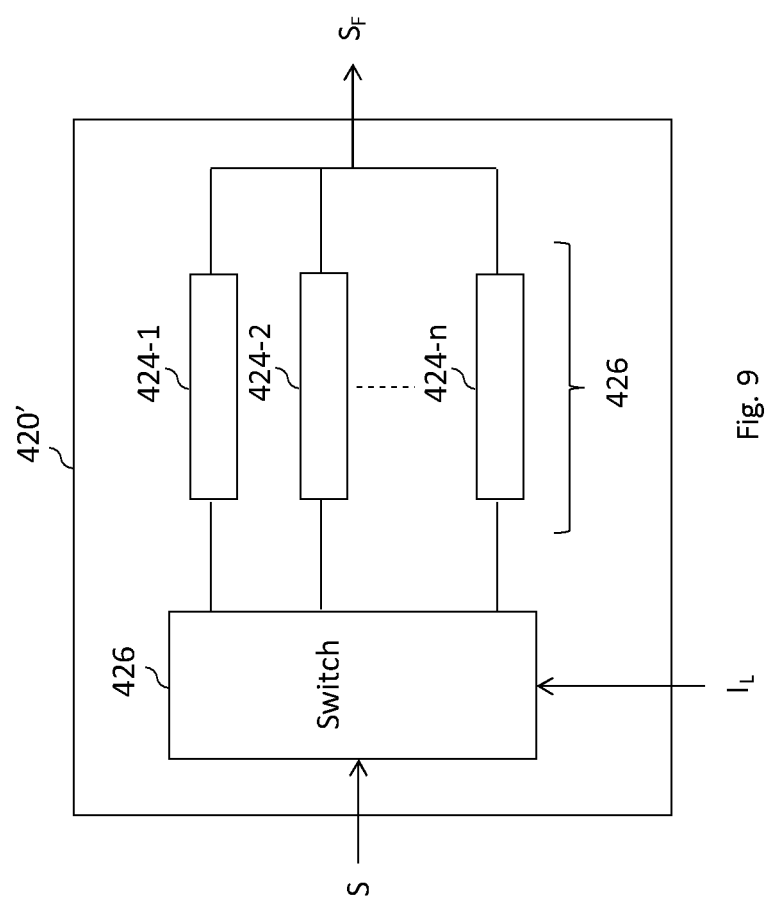
FIG. 9 illustrates an example of a band-pass filter module having an array of filters and a switch for selecting a filter from an array of filters to filter the electrical signal from the photodetector, according to an implementation of the first example embodiment.

As an example, the band-pass filter module 420' may, as illustrated in the example of FIG. 9, comprise a filter bank 422 having an array of n non-tunable filters 424-1 to 424-n, and a switch 426 for selecting a single non-tunable filter from the array of non-tunable filters 424-1 to 424-n to perform filtering of the electrical signal S from the photodetector 50 to generate the filtered electrical signal $S_F$. In some example embodiments, each filter of the array of non-tunable filters in the filter bank 422 may have substantially the same bandwidth but a different center frequency. Furthermore, the center frequencies of the plurality of non-tunable filters 424-1 to 424-n may be spaced substantially equidistant from each other such that the pass band of each non-tunable filter is substantially adjacent along the frequency axis to the pass band of another non-tunable filter of the filter bank 422. In some example embodiments, a spectral overlap may be arranged between the pass band of a non-tunable filter and the pass band of another non-tunable filter in the filter bank 422. This overlap may ensure that if the filtered signal output by a first non-tunable filter is critically sampled, the depth information corresponding to the Nyquist frequency can still be obtained by selecting a second non-tunable filter that has a pass band overlapping with the pass band of the first non-tunable filter.

It should be noted that the implementation of the filter bank is by no means limited to the example described above. For example, in an alternative example embodiment herein, the array of non-tunable filters in the filter bank may have the same center frequency but different predetermined bandwidths. In this case, selecting a different filter in the filter bank is equivalent to selecting a corresponding different range of frequencies caused by reflected OCT light from region 90 of a different size in the eye 70. Furthermore, in some example embodiments herein, the filter bank may comprise a mix of tunable and non-tunable filters.

Figure 10:
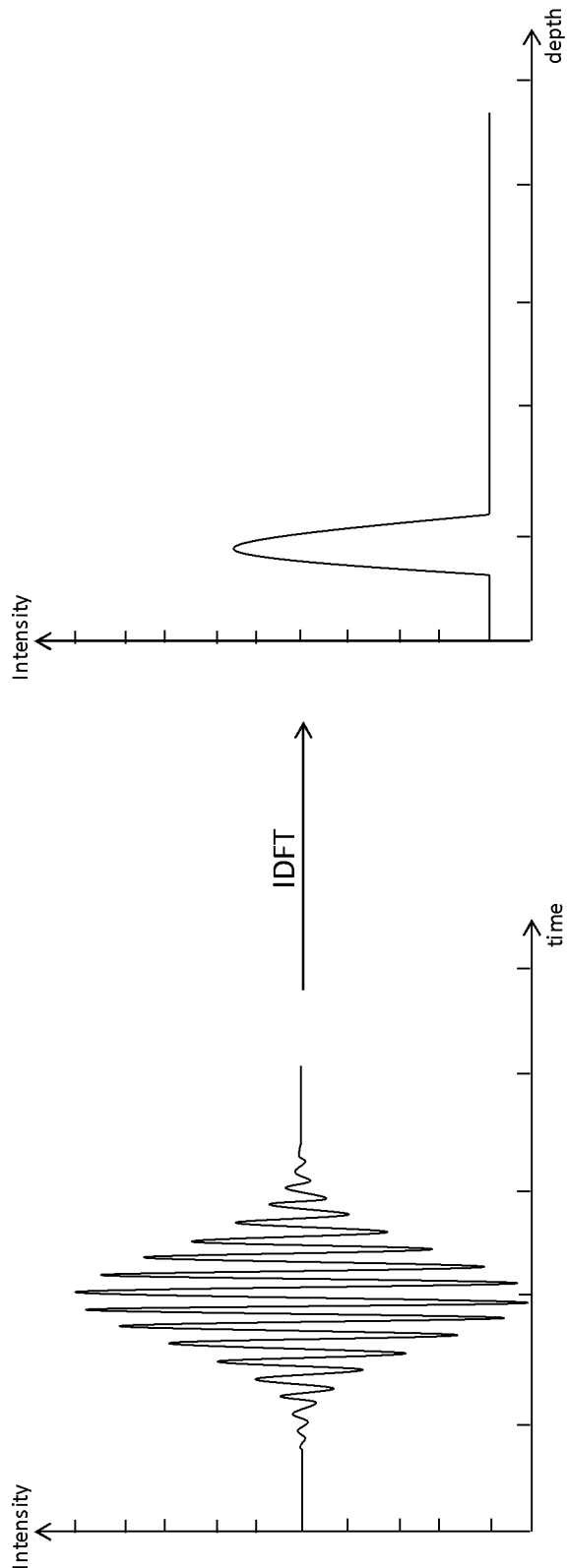
FIG. 10A illustrates an interferogram generated by a photodetector of the ophthalmic swept-source imaging system in accordance with the first example embodiment.
FIG. 10B illustrates the determination of depth information of the eye by performing an inverse discrete Fourier transform on samples of the interferogram in FIG. 9A.

FIG. 10A is a schematic illustration of the electrical signal generated by the photodetector 50, which signal is represented by an interferogram that correlates the detected power of the interference light with the wavenumber of the swept light source 10.

If the electrical signal over time is denoted by w(t), and the sampling rate of the sample acquisition module 440 is $f_s=1/T_s$, where $T_s$ is the sampling interval, the sampled signal $I_s(t)$ is given by:

$$I(t)=w(t)\Sigma_{n=-\infty}^{\infty}\delta(t-nT_s) \qquad (6)$$

The ophthalmic SS-OCT imaging system 600 may, as in the example embodiment of FIG. 8, further comprise the A-scan data generating module 610, which is arranged to generate A-scan data by calculating an inverse Fourier transform of the samples of the I(t) signal acquired by the sample acquisition module 440. In particular, for an ophthalmic swept-source OCT imaging system, the depth reflection profile or distance information can be determined by the inverse Fourier transform of the detected electrical signal over wavenumber. The inverse Fourier transform of the detected intensity $I_D(k)$ in equation (1) yields:

$$I_D(z) \propto \Sigma_{n=1}^N \sqrt{R_n R_R}[\gamma(2z_n)+\gamma(-2z_n)] \qquad (7)$$

wherein $\gamma(z_n)$ is the coherence function that is the inverse Fourier transform of the power spectral density of the light source S(k). As an example, denoting the samples of the electrical signal by i(m), m=0, 1, 2 ... M−1, the inverse Discrete Fourier Transform (IDFT) of the data sequence is given by:

$$A(l) = \frac{1}{M}\sum_{m=0}^{M-1} i(m)e^{\frac{2\pi lm}{M}}, \quad (l=0,1,2 \ldots M-1)$$

where A(l) may be understood to represent a data point to be mapped to an A-scan element of an A-scan, for example, the l-th data element of an A-scan defined by an array of M data points. As the output of the IDFT operation is complex-valued, only the magnitude of each A(l) value is taken to denote reflection information. For computational efficiency, the A-scan data generating module 610 may, as in the present example embodiment, compute the IDFT of the samples i(m) using a Fast Fourier Transform algorithm. As an example, FIG. 10B illustrates a plot of intensity against depth that is obtained performing inverse Fourier transform on the samples of the detected electrical signal in FIG. 10A. The A-scan data generating module 610 can be implemented using signal processing hardware, such as that of the apparatus 500 shown in FIG. 7.

In the present example embodiment, the adjustment of the pass band of the band-pass filter module 420 and the adjustment of the sampling rate of the sample acquisition module 440 allow the scan location to be adjusted in the axial direction (i.e. along the propagation direction of the light beam) of the swept-source OCT imaging system 600 without requiring any mechanical movement of the reference arm 412. Furthermore, mechanical adjustment of the reference arm 412 cannot typically be done between scans. Using the presently described methods, the imaging region in the depth direction of the eye 70 can be instantaneously changed. This is advantageous as the adjustment can be done between groups of scans when performing wide-field OCT scan of the eye 60.

Furthermore, when band-pass sampling is not used, the sample acquisition module 440 may be required to sample at a rate of at least twice the maximum frequency component in the frequency band of interest. This may limit the maximum axial depth for which imaging can be perform, and be computationally inefficient. However, by band-pass sampling the electrical signal generated by the photodetector 50, the sampling rate for acquiring samples of the electrical signal can be significantly reduced. It should be noted, however, that the bandwidth of the sample acquisition module 440 is still required to be sufficiently high to capture the highest frequency component of interest in the interference light signal, in order to generate a corresponding electrical signal S having the same frequency components.

In some embodiments, the scanning element 40 is arranged to scan the light beam 80 generated by the swept light source 10 by varying its scan angle (θ,φ). The A-scan data generating module 610 is further arranged to generate A-scan data $D_{A-scan}$ of a plurality of A-scans by calculating an inverse Fourier transform of the samples of the filtered electrical signal $S_F$ that have been acquired by the sample acquisition module 440 for varying values of the scan angle (θ,φ). Each A-scan of the plurality of A-scans is based on samples of the filtered electrical signal $S_F$ acquired by the sample acquisition module 440 from a respective region of a plurality of regions in the eye 70 that have been imaged in the scan.

The tomographic data generating module 620 of the ophthalmic swept-source OCT imaging system 600 is arranged to generate tomographic data by arraying the A-scans to form an array of the A-scans, wherein A-scan elements of each A-scan in the array are arranged along a first direction (Y) of the array, and the A-scans are arrayed in a second direction (X) of the array. Furthermore, the tomographic data generating module 620 is arranged, when generating the tomographic data, to offset by an offset amount each A-scan in the array along the first direction (Y) relative to other A-scans in the array. This offset amount is based on a location indicative of a location of the region in the axial direction, which region has been imaged to obtain the A-scan. The array may, as in the present example embodiment, be a two-dimensional array constituting a B-scan, although a three-dimensional array constituting a C-scan may be similarly formed. Furthermore, the first and second directions of the array may respectively correspond to first and second dimensions of the array.

Figure 11:
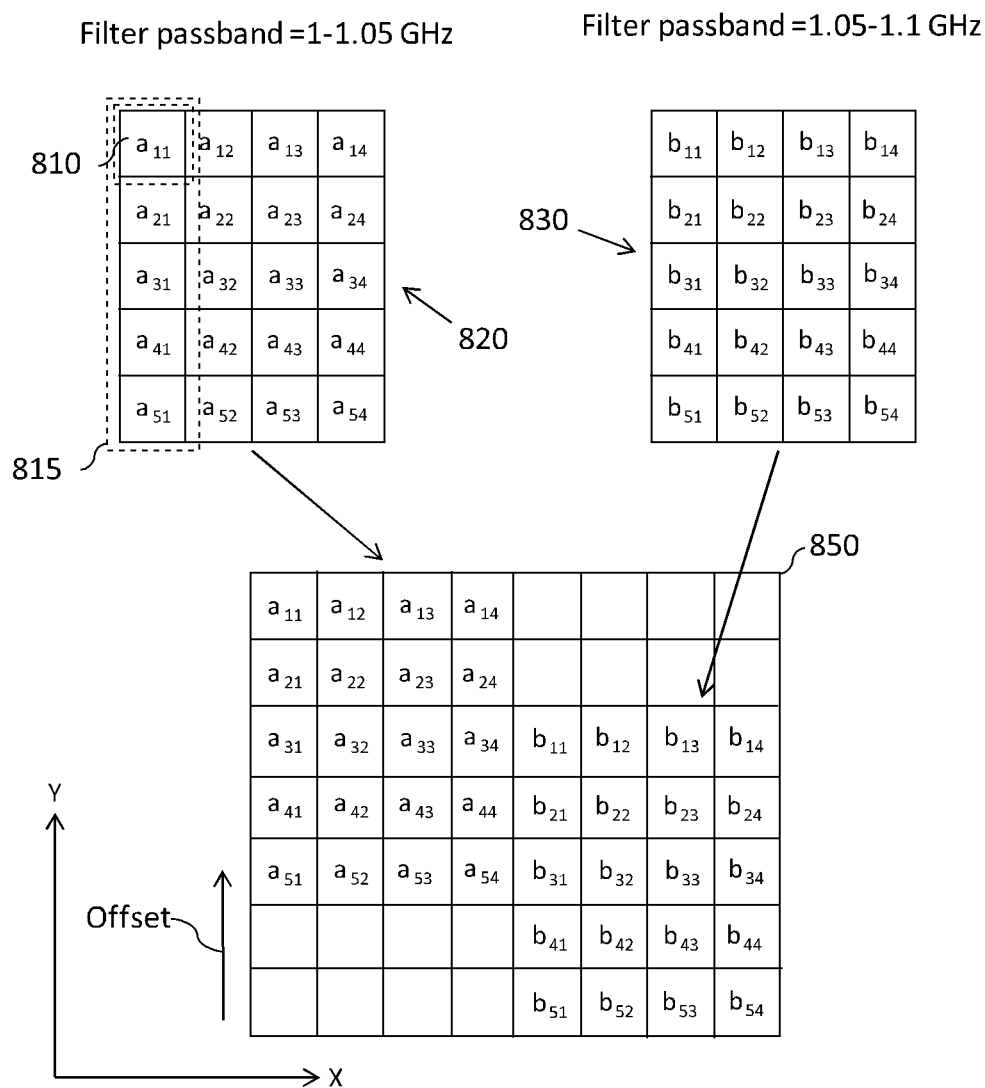
FIG. 11 illustrates the generation, by a tomographic data generating module of an example embodiment herein, of an array of A-scans by combining two groups of A-scans that correspond to two different depths in an axial direction of the eye.

FIG. 11 illustrates an example in which the tomographic data generating module 620 generates tomographic data by combining two groups of A-scans, each group corresponding to a region at a different location in the depth direction of the retina. In FIG. 11, the first group 820 of A-scans are obtained by setting the pass band of the band-pass filter module 420 to 1-1.05 GHz with the scan location of the imaging system 600 directed to a first lateral position on the retina 85 of the eye 70. The second group 830 of A-scans is obtained by setting the pass band of the band-pass filter module 420 to 1.05-1.1 GHz with the scan location of the ophthalmic swept-source OCT imaging system 600 directed to a second, different lateral position on the retina 85. The two groups of A-scans therefore correspond not only to cross-sections at different depth locations in the axial direction, but also different lateral locations of the eye 70. In FIG. 11, each A-scan 815 comprises a plurality of A-scan elements 810. The position of each A-scan element 810 in the group of A-scans is indicated by $a_{11}$ ... $a_{54}$ in the case of the first group 820 and indicated by $b_{11}$ ... $b_{54}$ in the case of the second group 830.

In FIG. 11, the tomographic data generating module 620 generates an array 850 of A-scans by arraying the first group 820 and the second group 830. As illustrated in FIG. 11, the A-scan elements in the array 850 of A-scans are arranged in a Y-dimension of the array 850, wherein the Y-dimension of the array corresponds to an axial direction along the imaging axis of the ophthalmic swept-source OCT imaging system 600 (i.e. along the depth direction of the eye 70 in the propagation direction of the light beam) such that an A-scan element having a higher Y-coordinate value corresponds to a deeper position under the surface of the retina 85, than an A-scan element having a lower Y-coordinate value. On the other hand, different A-scans are arrayed in the X-dimension of the array 850. The X-dimension of the array 850 corresponds to a transverse scanning direction of the ophthalmic swept-source OCT imaging system 600 (i.e. a lateral direction across the surface of the retina 85) such that an A-scan element having a higher X-coordinate value corresponds to a position further across the surface of the retina.

As the second group 830 of A-scans are obtained by setting the pass band of the band-pass filter module 420 to a higher frequency band (compared to the frequency band used to generate the first group 820), the second group 830 of A-scans therefore corresponds to a deeper region under the surface of the retina 85 compared to the first group 820. Accordingly, when arraying the first group 820 and the second group 830 to form array 850, the tomographic data generating module 620 may, as in the present example embodiment, offset the first group 820 by a predetermined amount relative to the second group 830, along the Y-dimension of the array 850. The tomographic data generating module 620 may, as in the present example embodiment, determine the offset amount for group 820 based on a location indicator indicative of a location of the region in the eye 70 that was imaged to generate group 820. As an example, in FIG. 11, a larger offset amount is applied to a group of A-scans that are generated based on reflected OCT light from a shallower location of the eye (along the propagation direction of the light beam). In some example embodiments, the ophthalmic swept-source OCT imaging system 600 may store a predetermined mapping of offset amounts against various locations within the eye 70.

In array 850, the empty positions may be filled using other generated A-scans, the details of which are not relevant to the present example embodiment. It should be noted that in array 850, the two groups 820 and 830 are arrayed along the X-direction as the two groups correspond to different lateral positions across the retina 85. However, when the groups of A-scans generated correspond to regions of different depth under the retina 70 but of the same lateral position in the eye 70, the tomographic data generating module 620 may form the array by arraying two groups of A-scans in the Y-direction instead.

In an example where the variation of a layer of interest in the retina 85 as the scanning laser is swept in a transverse direction (i.e. along the surface of the retina 85) is known, the pass band of the bandpass filter module 420 and the sampling rate of the sample acquisition module 440 may be adjusted based on this known variation in order to "follow" the layer of interest. More specifically, in a variant of the present example embodiment, the control module 430 may be arranged to adjust the pass band of the bandpass sampling module 420 and the sampling rate of the sample acquisition module 440 using a predetermined variation of the pass band and the sampling rate with a scan angle $(\theta,\varphi)$ of light illuminating the region 90 of the eye 70 during the OCT scan, such that the ophthalmic swept-source OCT imaging system 600 images, as the region 90 of the eye 70, a cross-section of a retina 85 that is of substantially constant thickness from a surface of the retina 85, for example. The predetermined variation may, as in the present example embodiment, be based on a known geometry of the eye 70, such as, for example, a particular curvature of the retina or a specific layer under the retina 85.

More specifically, referring back to FIG. 5, it is noted that the eye 70 has a particular curvature such that the light backscattered from the vicinity of point A on the retina travels a greater distance in the sample arm 414 than light backscattered from the vicinity of point B on the retina. As a result, the ophthalmic swept-source OCT imaging system 600 may scan further under the retina 85 in the vicinity of point B than in the vicinity of point A, because the maximum imaging range (namely, the maximum depth for which interference occurs, which is determined by path length of the reference arm 412 and the coherence length of the swept-light source 10) extends further into the retina 85 in the vicinity of point B than in the vicinity of point A. This causes the imaged cross-section of the retina 85 in the vicinity of point A to be of a smaller thickness from the surface of the retina 85 compared to the imaged cross-section in the vicinity of point B. When an OCT scan of a region around point A is combined with an OCT scan of a region around point B, the layers of the eye 70 which are of interest may not extend substantially horizontally across the overall OCT image. Furthermore, the geometry of the eye 70 varies from patient to patient and it may be difficult to configure the imaging system in a way that is suitable for all patients.

The aforementioned problem can be solved by the control module 430 dynamically adjusting the pass band of the band-pass filter module 420 based on a known geometry of the eye 70, which may be determined by carrying out an initial scan. This geometry may, for example, be characterised by the distance travelled by the light in the sample arm 414 when imaging various regions of eye 70, or a particular curvature of the surface of the retina 85 or a layer under the surface of the retina 85. Based on this determined geometry of the eye 70, an appropriate pass band can be set for each scan angle θ of the ophthalmic swept-source OCT imaging system. As an example, referring back to FIG. 5, as backscattered light travels a longer distance along the sample arm 414 when reflected from point A than from point B, the control module 430 may be arranged to set a pass band of the band-pass filter module 420 with a higher center frequency when scanning central regions of the retina 85 that correspond to smaller scan angles (for example, in the vicinity of point A in FIG. 5). Furthermore, as the backscattered light travels a shorter distance from point B compared with point A, the control module 430 may set the center frequency of the pass band to a lower value when scanning peripheral regions of the retina 85 that correspond to larger scan angles. As the pass band is adjusted, the control module 430 may also adjust the sampling rate in accordance with the band-pass sampling theorem. Accordingly, a predetermined variation or mapping between the scan angle(s) and the sampling rate of the sample acquisition module 440 may also be used. This predetermined variation of the pass band and sampling rate with the scan angle may be stored or provided in any suitable form, such as a look-up table.

FIG. 12 illustrates a non-limiting example of a look-up table which can be used to determine the pass band of the bandpass filter module 420 and the sampling rate of the sample acquisition module 440 based on the scan angle (θ,φ) of light illuminating the region 90 of the eye 70 during the OCT scan. As illustrated in FIG. 12, each entry of the table corresponds to a respective pair of scan angle values, and stores data identifying the pass band (PB) and the sampling rate (Fs) to be selected for pair of scan angle values.

In the aforementioned example embodiments, it has been assumed that the bandwidth of the band-pass filter module 420 is high enough to capture the entire frequency band corresponding to the region 90 of interest in the eye 70. However, in a scenario where the physical size of the region 90 along the axial direction corresponds to a frequency band that is too wide in its bandwidth to be band-pass sampled, the signal across the frequency band may instead be acquired in separate sub-bands by using a filter bank and a plurality of sample acquisition modules are then used to acquire samples of signals in each sub-band at a lower sampling rate.

An example variant of the swept-source OCT imaging system (400 and/or 600) in accordance with another example embodiment herein will now be described with reference to FIG. 13. This example embodiment comprises a swept-source OCT imaging system 900 having components like those represented in FIG. 8 (including the photodetector 50, the band-pass filter module 420, and the sample acquisition module 440), and also comprising a control module 430', a filter module 910 (also referred to herein as "second filter module 910"), a sample acquisition module 920 (also referred to herein as "second sample acquisition module 920"), an A-scan data generating module 610', and tomographic data generating module 620', whose functionality is described below. For convenience, the swept light source 10, interferometer 410 and scanning element 40 (of FIG. 5) are not shown in FIG. 13.

The second filter module 910 is arranged to generate a second filtered electrical signal $S_{F2}$ by filtering the electrical signal S received from the photodetector 50. Furthermore, the swept-source OCT imaging system 900 of the present example embodiment further comprises the second sample acquisition module 920 that is arranged to acquire a second set of samples $I_2$ (t) of the second filtered electrical signal (received from module 910) to be used for generating OCT image data (i.e., by virtue of tomographic data generating module 620' in FIG. 13). The control module 430' is further arranged to set the pass band of the band-pass filter module 420 such that the band-pass filter module 420 extracts frequency components of the electrical signal S (received from photodetector 50) in a first sub-band of the frequency band and substantially attenuate signals outside the first sub-band. Furthermore, in the present example embodiment, the control module 430' is further arranged to set the sampling rate of the sample acquisition module 440 such that the sample acquisition module 440 acquires the set of samples $I_1(t)$ (e.g., a first set of samples) by band-pass sampling the frequency components of the filtered electrical signal $S_F$ (received from bandpass filter module 420) in the first sub-band of the frequency band. The first sub-band corresponds to a first sub-region of the region 90 of the eye 70, and the frequency components spanning the first sub-band are caused by interference of the light from the swept-light source 10 which has been scattered by a first sub-region of the region 90 of the eye 70, with the light from the swept-light source 10 that is propagating along the reference arm 412.

Moreover, in these variants, the control module 430' is further arranged to set a pass band of the second filter module 910 such that the second filter module 910 extracts frequency components of the electrical signal S in a second sub-band of the frequency band which partially overlaps the first sub-band, the second sub-band corresponds to a second sub-region of the region 90. Furthermore, the partial overlap between the first sub-band and the second sub-band corresponds to an overlapping region between the first sub-region and the second sub-region. The frequency components spanning the second sub-band are caused by interference of the light from the swept-light source 10, which has been scattered by a second sub-region of the region 90 of the eye 70, with the light from the swept-light source 10 that is propagating along the reference arm 412.

In addition, the control module 430' is further arranged to set a second sampling rate of the second sample acquisition module 920 such that the second sample acquisition module 920 acquires the second set of samples $I_2(t)$ by sampling the frequency components of the electrical signal in the second sub-band using the second sampling rate that is different from the first sampling rate.

Figure 13:
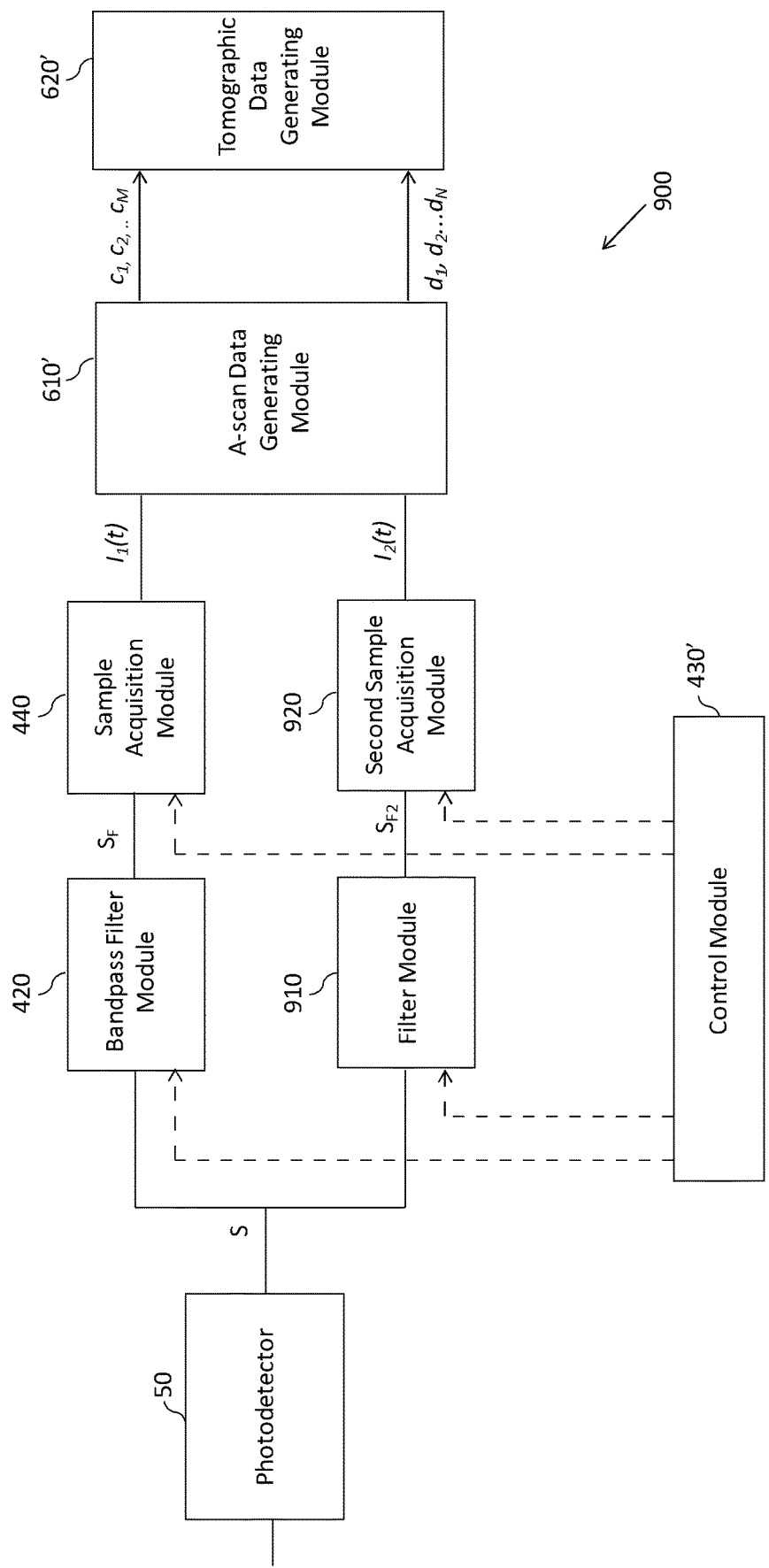
FIG. 13 illustrates an example implementation of an ophthalmic swept-source OCT imaging system according to a second example embodiment herein, wherein the system employs a second filter module and second sample acquisition module.
Figure 14:
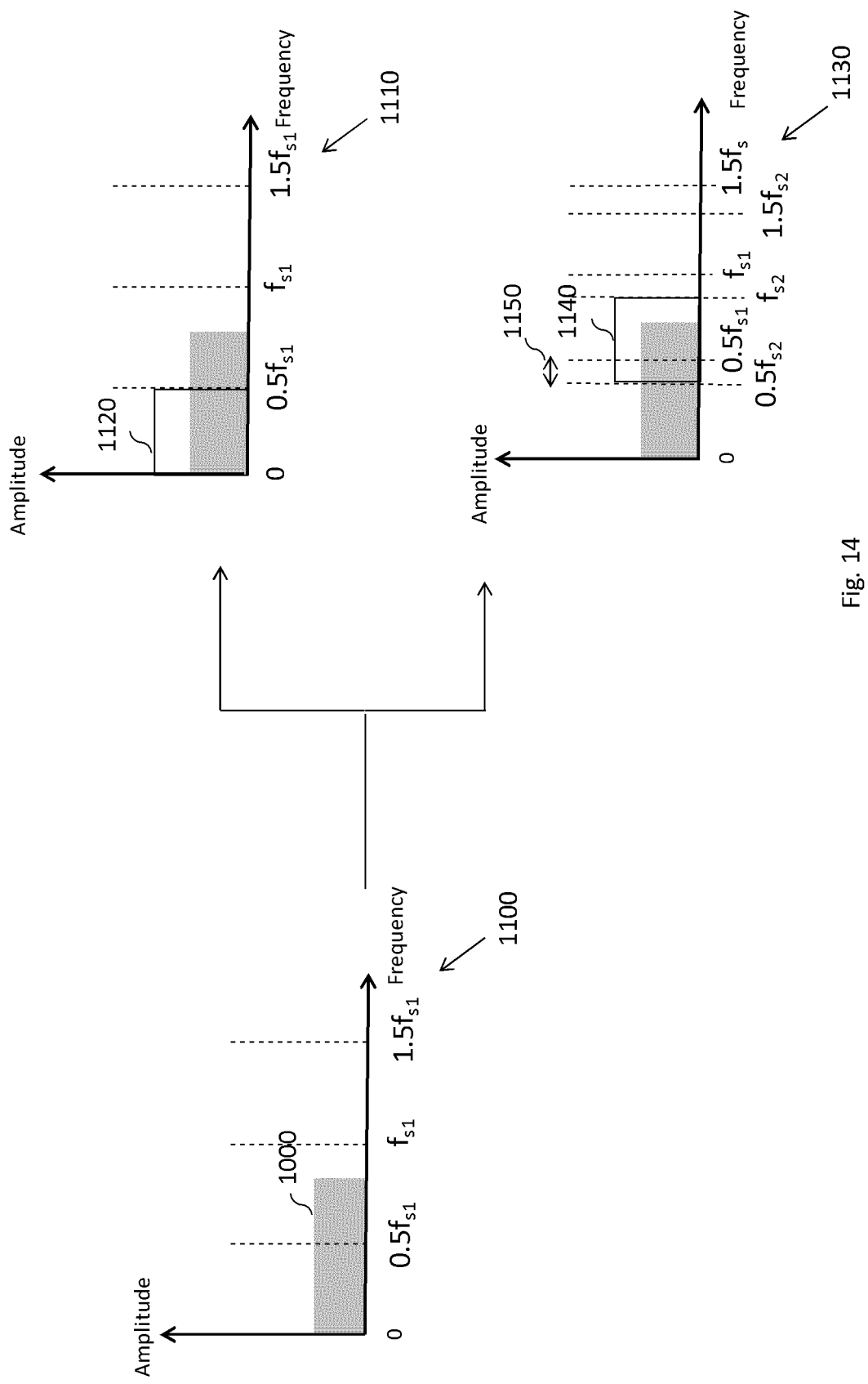
FIG. 14 illustrates a spectral diagram of a signal spanning a frequency band that is acquired as two separate signals over two sub-bands using the ophthalmic swept-source OCT imaging system of the second example embodiment herein.

FIG. 14 illustrates an example of how a signal spanning frequency band 1000 and having a bandwidth that exceeds half of the maximum sampling rate of the sample acquisition module 440, can be acquired as two separate signals spanning two respective sub-bands of the frequency band 1000 by using the components in FIG. 13. Referring to amplitude-frequency plot 1110 in FIG. 14, the control module 430' sets the pass band of the second filter module 910 to pass frequency components of the electrical signal in a sub-band 1120 of the frequency band 1000. The signal in the sub-band 1120 is then critically sampled at a sampling rate of $f_{s1}$ that is twice the bandwidth of the sub-band 1120. In amplitude-frequency plot 1130 in FIG. 14, the control module 430' also sets the pass band of the band-pass filter module 420 to pass frequency components of the electrical signal S in a sub-band 1140 of the frequency band 1000, wherein sub-band 1140 overlaps in part with sub-band 1120 and comprises the remaining portion of the frequency band 1000 not included in sub-band 1120. The frequency components of the signal in sub-band 1140 may, as in the present example embodiment, be band-pass sampled using a sampling rate of $f_{s2}$ that is lower than the sampling rate $f_{s1}$. Furthermore, in the present example, a spectral overlap 1150 exists between sub-band 1120 and sub-band 1140, such that a Nyquist boundary for sampling rate $f_{s1}$ is comprised in sub-band 1140, and that a Nyquist boundary for sampling rate $f_{s2}$ is comprised in sub-band 1120. This spectral overlap ensures that the reflectivity information corresponding to critical frequency $0.5f_{s1}$ can be provided by samples of the frequency components in sub-band 1140. Similarly, reflectivity information corresponding to critical frequency $0.5f_{s2}$ can be provided by samples of frequency components in sub-band 1120. In this manner, any aliasing caused by critical sampling of a signal in one sub-band can be corrected with samples acquired for the signal in the other sub-band. It should be noted that the term "critical frequency" used herein is a term of art, and is not intended to limit the scope of the invention in any way.

It should also be noted that, although FIG. 14 illustrates the signal in frequency band 1000 to be a low-pass signal and the second filter module 910 to be a low-pass filter, the frequency band may instead be a band-pass signal and second filter module 910 may be a band-pass filter as a result. In addition, although the example embodiments described with reference to FIGS. 13 and 14 split the frequency band into two sub-bands (by using two filter modules and two sample acquisition modules), the frequency band may be similarly split in N number of sub-bands using N number of filter modules (N being an integer greater that 2), each filter module having a pass band that corresponds to a particular sub-band and wherein a spectral overlap is arranged between adjacent sub-bands to allow any aliasing due to critical sampling to be corrected.

Returning to the example embodiment described above with reference to FIG. 13, the A-scan data generating module 610' may be arranged to generate A-scan data of an A-scan by calculating an inverse Fourier transform of the first set of samples $I_1(t)$ (acquired by sampling frequency components in the first sub-band) to generate a first subset of A-scan data $(c_1, c_2, \ldots c_M)$, calculating an inverse Fourier transform of the second set of samples (acquired by sampling frequency components in the second sub-band) to generate a second subset of A-scan data $(d_1, d_2, \ldots d_N)$. Furthermore, the tomographic data generating module 620' may be arranged to generate an A-scan by mapping data from the first subset of A-scan data to a first set of A-scan elements of the A-scan based on a location of the first sub-region along a propagation direction of the beam 80 of light incident on the eye 70 during use of the ophthalmic swept-source OCT imaging system to acquire the first set of samples and the second set of samples. The tomographic data generating module 620' may be further arranged to generate the A-scan by mapping data from the second subset of A-scan data to a second set of A-scan elements of the A-scan based on a location of the second sub-region along the propagation direction of the beam 80 of light. As an example, each A-scan element of the A-scan represents a pixel of the A-scan, and the amplitude of the A-scan data assigned to an A-scan element represents an intensity of the pixel. As the A-scan data represents intensity values measured along an axial direction of eye 70 that is in the propagation direction of the light beam 80, each data point of the A-scan data therefore corresponds to a particular frequency, or a particular depth in the axial direction of the eye 70. Therefore, each data point of the A-scan data can be mapped to a corresponding A-scan element based on the region of the eye 70 to which the data point corresponds.

Figure 15:
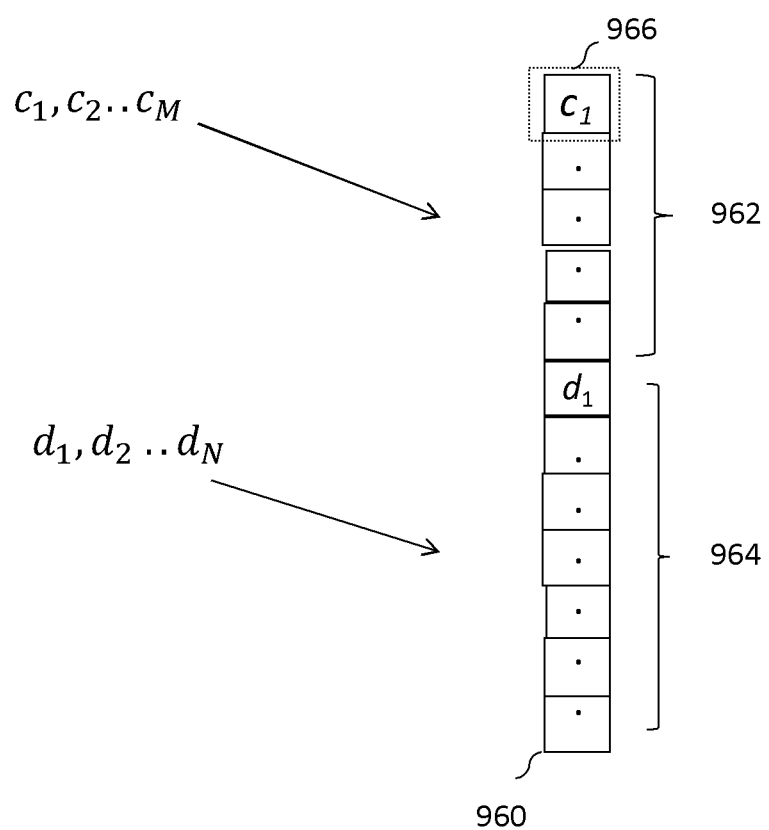
FIG. 15 illustrates a non-limiting example of a mapping which maps data from a first subset of A-scan data to a first set of A-scan elements of an A-scan, and data from the second subset of A-scan data to a second set of A-scan elements of the A-scan.
Figure 16:
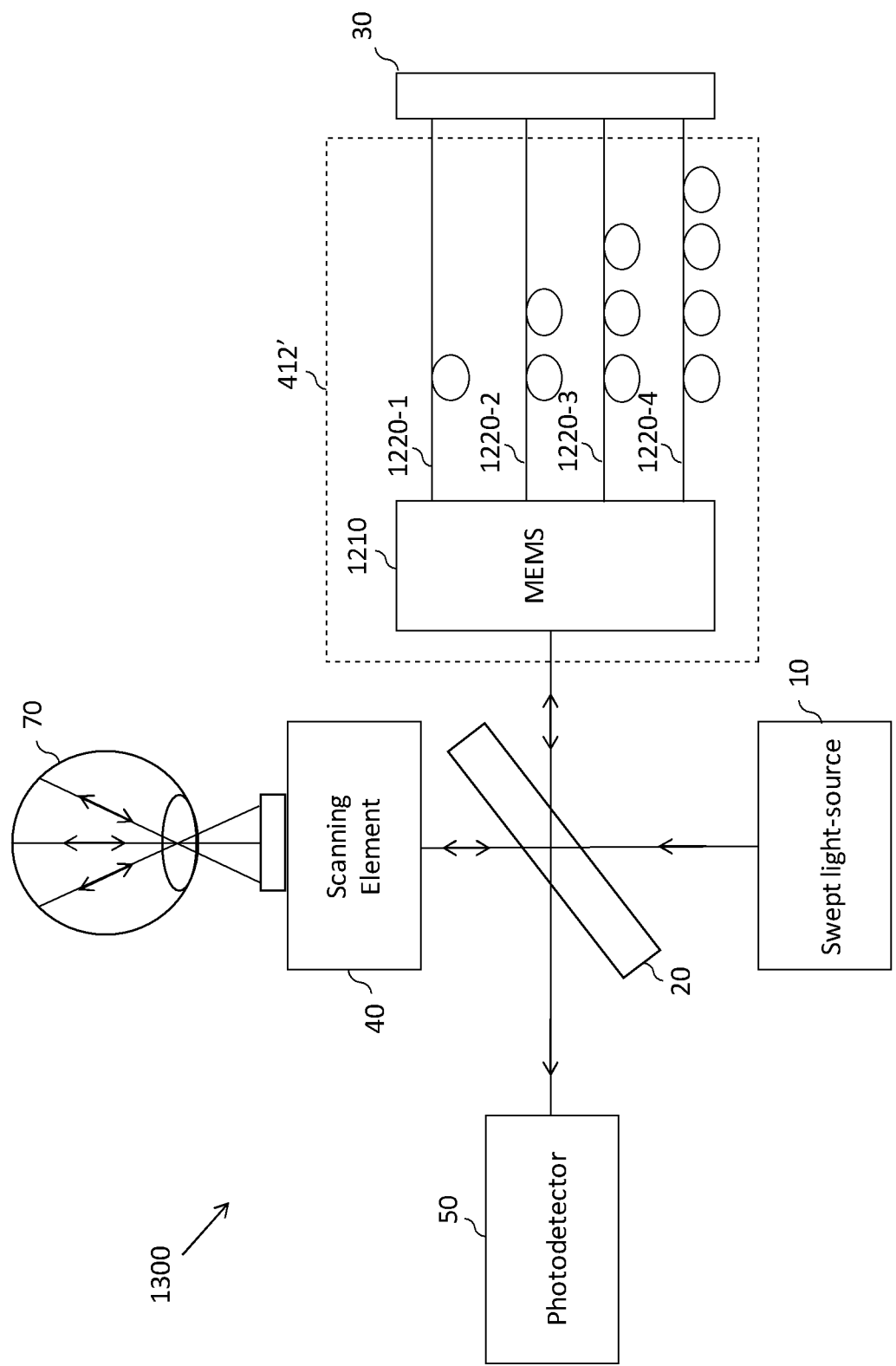
FIG. 16 is a schematic illustration of a swept-source OCT imaging system according to another example embodiment herein, wherein the system includes, among other components, an interferometer comprising a micro-electromechanical switch for selecting an optical delay line of a plurality of optical delay lines having different path delays.

FIG. 15 illustrates a non-limiting example mapping of data from the first subset of A-scan data $(c_1, c_2, \ldots c_M)$ to a first set of A-scan elements 962 of an A-scan 960, and data from the second subset of A-scan data $(d_1, d_2, \ldots d_N)$ to a second set of A-scan elements 964 of the A-scan 960. In FIG. 15, each A-scan element 966 of the A-scan 960 corresponds to a pixel of the A-scan and therefore corresponds to a different depth position in the eye 70 in the propagation direction of the light beam 80. As the first subset $(c_1, c_2, \ldots c_M)$ and second subset $(d_1, d_2, \ldots d_N)$ of A-scan data provide the reflectivity information in the depth direction of the eye 70, data points from the first subset $(c_1, c_2, \ldots c_M)$ and the second subset $(d_1, d_2, \ldots d_N)$ of data are mapped to corresponding to A-scan elements based on the region (in particular the depth of the region) of the eye 70 to which the data points correspond.

Referring back to FIG. 14, to ensure that correct depth information is obtained at the Nyquist frequency, the A-scan element in an A-scan that corresponds to the Nyquist frequency $0.5f_{s1}$ may be assigned a data point from the second subset of A-scan data corresponding to a frequency to which $0.5f_{s1}$ is mapped after band-pass sampling using a sampling rate of $f_{s2}$. Similarly, the A-scan element in the A-scan that corresponds to the Nyquist frequency $0.5f_{s2}$ may be assigned a data point from the first subset of A-scan data corresponding to the frequency to which $0.5f_{s2}$ is mapped after band-pass sampling using a sampling rate of $f_{s1}$. For the region of spectral overlap between the first sub-band and the second sub-band, the data points corresponding to the region of spectral overlap from either the first subset of A-scan data or the second subset of A-scan data may be mapped to the corresponding A-scan elements in the A-scan.

Referring to FIG. 13, in some example embodiments herein, the control module 430' may be further arranged to set the pass band of the band-pass filter module 420 and the sampling rate of the sample acquisition module 440 based on a location of the first sub-region along a propagation direction of the beam 80 of light incident on the eye 70 during use of the ophthalmic swept-source OCT imaging system 900 to acquire the set of samples of the filtered electrical signal for generating the OCT image data representing the image of the region of the eye 70. Furthermore, the control module 430' is further arranged to set the pass band of the second filter module 910 and the second sampling rate of the second sample acquisition module 920 based on the location indicator $I_L$ that is indicative of a location of the second sub-region along the propagation direction of the beam 80 of light. The location indicator $I_L$ may be provided to the control module 430', or may alternatively be determined by the control module 430'. For example, the control module 430' may derive the location indicator $I_L$ based on a region of the eye selected by the user for imaging, or identified through a feature detection algorithm. The control module 430' may, as in the present example embodiment, set the pass band of the second filter module 910 using a mapping between the location of the second sub-region (in the propagation direction of beam 80 of the incident light) and the pass band of the second filter module 910. In some example embodiments, the control module 430' may be further arranged set the pass band using a mapping between the size of the second sub-region along the propagation direction of the beam 80 of light and the pass band of the second filter module 910. The second sampling rate may be determined from the pass band of the second filter module 910 by using a pass band to sampling rate mapping or conversion algorithm that is based on the bandpass sampling theorem.

In FIG. 13, the bandpass filter module 420 may be implemented in any manner as described in previous example embodiments, such as, for example, as a tunable filter, or alternatively as an array of non-tunable filters from which one filter may be selected. Furthermore, the second filter module 910 may comprise a tunable filter having a pass band with a tunable center frequency, and wherein the control module 430' is further arranged to adjust the center frequency of the pass band of the tunable filter based a location of the second sub-region along a propagation direction of the beam 80 of light incident on the eye 70 during use of the ophthalmic swept-source OCT imaging system 900 to acquire the second set of samples of the filtered electrical signal. The control module 430' may be arranged to adjust the center frequency of the pass band based using a mapping between the location of the second sub-region and the center frequency of the pass band of the tunable filter. In some example embodiments, the tunable band-pass filter may alternatively or in addition, have a tunable bandwidth, and the control module 430 may further be arranged to adjust the bandwidth of the tunable filter based on a range indicator indicative of a size of the second sub-region along the propagation direction of the beam 80 of light. The control module 430' may, in some example embodiments, be arranged to adjust the bandwidth of the pass band based using a mapping between the size of the second sub-region and the bandwidth of the second tunable filter.

In some example embodiments, instead of a tunable filter, the second filter module 910 may instead comprise a plurality of non-tunable filters having pass bands with different center frequencies, and wherein the control module 430' is arranged to set the pass band of the second filter module 910 by selecting a non-tunable filter from among the plurality of non-tunable filters. In one example embodiment herein, each non-tunable filter may be a band-pass filter or a low-pass filter, and the selecting can be performed based on a location indicator which is indicative of a location of the second sub-region along a propagation direction of the beam of light incident on the eye 70 during use of the ophthalmic swept-source OCT imaging system to acquire the second set of samples. For example, the control module 430' may select the non-tunable filter using a predetermined mapping between the location of the second sub-region and the non-tunable filter to be selected.

In the above example embodiments, it is assumed that the maximum frequency component of interest in the interference light signal generated by the interferometer falls within the detection bandwidth of the photodetector such that an electrical signal having corresponding frequency components is generated. However, in cases where a path delay between the reference arm and the sample arm is great enough such that the resulting interference signal has frequency components whose frequencies exceed the cut-off frequency of the photodetector, the path delay can be reduced so that the frequency components of the interference light signal come below the cut-off frequency of the photodetector. As explained above, reference arm delay adjustment has traditionally required physical movement of the reference mirror 30 (FIG. 1) using a stepper motor or the like, and has therefore been slow to implement.

Another example embodiment herein, relating to a reference arm delay adjustment mechanism, will now be described with reference to FIG. 14. In FIG. 14, a swept-source OCT imaging system 1300 according to the present example embodiment is shown, wherein the system 1300 comprises photodetector 50, scanning element 40 for scanning eye 70, and swept light source 10, which are similar to those corresponding components described above, and wherein the system 1300 also comprises an interferometer constructed according with the present example embodiment. Although not shown in FIG. 14 for convenience, the system 1300 also may comprise a band-pass filter module, a sample acquisition module and control module, and preferably also an A-scan data generating module and a tomographic data generating module, as described in one or more of the example embodiments described above. In the present example embodiment, the interferometer comprises a beam splitter 20 and a reference mirror 30 as described above, as well as a reference arm delay adjustment mechanism 412' that allows relatively fast adjustment of path delay (as compared to reference arms without mechanism 412'), which can be useful to reduce the frequency of the interference light signal detected by the photodetector 50. More specifically, reference arm delay adjustment mechanism 412' shown in FIG. 14, which forms a reference arm of the interferometer, comprises a plurality of optical delay lines 1220-1 to 1220-4, each of which has a different optical path length. The reference arm delay adjustment mechanism 412' further comprises a micro-electromechanical (MEM) switch 1210, which is arranged to select an optical delay line of the plurality of optical delay lines 1220-1 to 1220-4 by rotating one or more micro-mirrors therein. In example embodiments herein that include the reference arm delay adjustment mechanism 412', the control module 430' may be arranged to generate a reference arm adjustment signal based on a location indicator indicative of a location of the region 90 along a propagation direction of the beam 80 of light incident on the eye 70 during use of the ophthalmic swept-source OCT imaging system 1300 to acquire the set of samples of the filtered electrical signal $S_F$ for generating the OCT image data representing the image of the region 90 of the eye 70. Furthermore, the control module 430 of the present example embodiment may be arranged to control the MEM switch 1210 to select, based on the reference arm adjustment signal, an optical delay line of the plurality of optical delay lines 1220-1 to 1220-4 to allow light to propagate in the reference arm delay adjustment mechanism 412', using the selected optical delay line and thereby set an optical delay between the light propagating along the reference arm delay adjustment mechanism 412' and the light propagating along the sample arm 414. The location indicator may be provided to the control module 430', or may alternatively be determined by the control module 430' based on a region of the eye to be imaged selected by the user or identified by a feature detection algorithm. Furthermore, in some example embodiments, the control module 430' may be arranged to control the MEM switch 1210 to select the optical delay line based on a predetermined mapping between the location of the region and the optical delay line to be selected.

Furthermore, the control module 430 may be arranged to control the MEM switch 1210 to select, as the optical delay line, an optical delay line of the plurality of optical delay lines 1220-1 to 1220-4, such that a frequency of the interference light signal (caused by interference of light propagating in the selected optical delay line in the reference arm delay adjustment mechanism 412' and light in the sample arm 414) is below a cut-off frequency of the photodetector 50. The optical delay lines may be fiber-based or free-space based.

The use of MEM switch 1210 to change the optical path length of the mechanism 412' by selecting an optical delay line from a set of optical delay lines 1220-1 to 1220-4 that have different optical path lengths allows almost instantaneous adjustment of the path delay. In one example embodiment herein, only a limited number of optical delay lines are arranged for selection. Nonetheless, coarse path length adjustment achieved using MEM switching can be combined with fine adjustment of imaging depth that is achievable through band-pass sampling as described in the above example embodiments.

It should be noted that, in other example embodiments herein, another type of fast optical switch (in other words, another kind of fast optical router) may be used in place of a MEM switch 1210 to select an optical delay line of the plurality of optical delay lines 1220-1 to 1220-4 as described above. For example, the optical switch (not shown) may take the alternative form of a photonic switch, which is arranged to steer the light beam to a selected one of the optical delay lines 1220-1 to 1220-4 by exploiting a non-linear property of a material (e.g. a semiconductor-based material) in the photonic switch. In other example embodiments, the optical switch may steer the light beam to a selected one of the optical delay lines 1220-1 to 1220-4 using a piezoelectric effect displayed by a material in the optical switch, for example. As a further alternative, an optical switch which relies on a magneto-optic effect may be used in place of MEM switch 1210.

Although the example embodiments described above relate to an ophthalmic swept-source OCT imaging system for imaging a region of an eye, it should be appreciated that the applicability of the methods described therein is not limited to the field of ocular imaging. These methods are more generally applicable to swept-source OCT imaging systems for imaging objects other than the eye. For example, a swept source OCT imaging system according to an example embodiment may alternatively be used in cardiology and intravascular applications (intravascular OCT), oncology (laparoscopic OCT, endoscopic OCT and bronchoscopic OCT), dermatology (for imaging skin tissue) or dentistry (to acquire dental OCT scans). Furthermore, the object to be imaged need not be biological. Swept source OCT imaging systems according to other example embodiments may be used in industrial applications such as material thickness measurements (e.g. thickness measurement of semiconductor wafers), surface roughness characterization, surface and cross-section imaging, and volume loss measurements in a variety of materials.

The example aspects described herein avoid limitations, at least some of which are specifically rooted in computer technology, relating to conventional swept-source OCT imaging systems such as those in which the performance thereof is limited by acquisition sampling rate limitations and/or an inability to adjust optical path differences quickly enough to avoid/reduce performance limitations. By virtue of the example aspects described herein, for example, different frequency components in a detected electrical signal (corresponding to different regions in a depth direction of an object) are selected (e.g., using a tunable anti-aliasing filter module), and samples of the filtered electrical signal are acquired using a sampling rate based on a frequency band of interest (using a sample acquisition module having an adjustable sampling rate), in accordance with bandpass sampling criterion. In this manner, during a retinal scan, for example, high-frequency components in the electrical signal resulting from retinal layers at greater depths can be "wrapped" into the first Nyquist zone, thus significantly relaxing sampling rate requirements. As a result, at least some example imaging systems described herein can acquire a reflectivity profile for retinal depths that would not otherwise be measurable owing to conventional limitations imposed (at least in part) by a maximum sampling rate of a sample acquisition module. Also, at least some example embodiments described herein can perform faster path-delay adjustment (i.e., relative to conventional systems) by, for example, employing switchable selection between optical delay lines. Moreover, at least some example embodiments herein allow acquisition of OCT image scans in which at least some artefacts caused by a curvature of a retina of an eye within an imaged region are suppressed or eliminated. By virtue of the capabilities of the example aspects described herein, at least some of which are rooted in computer technology, the example aspects described herein improve computer processing (e.g., by enabling sampling rate requirements to be relaxed, enabling acquisition of reflectivity profiles at more retinal depths than known conventionally, enabling faster path-delay adjustments, suppressing/eliminating undesired artefacts, and reducing computer processing and memory storage requirements as a result), and also improve the field(s) of medical imaging and medical devices, in addition to OCT imaging systems.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized in ways other than those shown in the accompanying figures.

Software embodiments of the examples presented herein may be provided as, a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects of the invention, as described above.

Included in the programming and/or software of the system are software modules for implementing the procedures described herein. In some example embodiments herein, a module includes software, although in other example embodiments herein, a module includes hardware, or a combination of hardware and software.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

The invention claimed is:

1. A swept-source optical coherence tomography (OCT) imaging system for imaging a region of an object, comprising:
　a swept light source arranged to generate a beam of light of a wavelength which varies over time;
　a scanning element arranged to scan the beam of light across the object;
　an interferometer having a sample arm and a reference arm, and arranged to generate an interference light signal during use of the swept-source OCT imaging system by combining light scattered by the region of the object and propagating along the sample arm, as a result of the beam being scanned across the object, with light from the beam propagating along the reference arm, wherein the reference arm comprises a plurality of optical delay lines, each optical delay line having a different optical path length;
　an optical switch arranged to switchably allow light to propagate using one of the plurality of optical delay lines;
　a photodetector arranged to receive the interference light signal and generate an electrical signal (S) that is indicative of the interference light signal, the electrical signal (S) comprising frequency components spanning a frequency band, the frequency components being caused by interference of the light scattered by the region of the object and propagating along the sample arm, with the light from the beam propagating along the reference arm;

a band-pass filter module arranged to generate a filtered electrical signal ($S_F$) by band-pass filtering the electrical signal (S), wherein the band-pass filter module comprises at least one of (a) a tunable band-pass filter or (b) a plurality of non-tunable bandpass filters;

a sample acquisition module arranged to acquire a first set of samples of the filtered electrical signal ($S_F$);

a filter module arranged to generate a second filtered electrical signal ($S_{F2}$) by filtering the electrical signal (S);

a second sample acquisition module arranged to acquire a second set of samples of the second filtered electrical signal ($S_{F2}$); and at least one processor and a memory storing computer-readable instructions that, when executed by the at least one processor, cause the at least one processor to perform a set of operations, the set of operations comprising:

providing a first signal to the band-pass filter module to set a pass band of the band-pass filter module such that the band-pass filter module extracts at least some of the frequency components of the electrical signal (S) in a first sub-band of the frequency band and substantially attenuates frequency components of the electrical signal (S) outside the first sub-band;

providing a second signal to the sample acquisition module to set a sampling rate of the sample acquisition module such that the sample acquisition module band-pass samples the filtered electrical signal ($S_F$) to acquire the first set of samples of the filtered electrical signal ($S_F$) in the first sub-band of the frequency band, the first sub-band corresponding to a first sub-region of the region of the object, for generating OCT image data representing an image of the region of the object, such that (a) the first set of samples is acquired by the sample acquisition module in accordance with a bandpass sampling theorem, and (b) the filtered electrical signal ($S_F$) is frequency-translated into a first Nyquist zone without overlapping with spectral images of the filtered electrical signal ($S_F$) that are caused by sampling, thereby enabling aliasing to be substantially avoided and further enabling a depth of the region corresponding to the acquired set of samples to be deeper than would otherwise be attainable by the swept-source OCT imaging system owing to a limited maximum sampling rate of the sample acquisition module;

providing a third signal to the filter model to set a pass band of the filter module to extract frequency components of the electrical signal in a second sub-band of the frequency band that partially overlaps the first sub-band, wherein the second sub-band corresponds to a second sub-region of the region, and wherein partial overlap between the first sub-band and the second sub-band corresponds to an overlapping region between the first sub-region and the second sub-region;

providing a fourth signal to the second sample acquisition module to set a second sampling rate to acquire the second set of samples in the second sub-band using the second sampling rate, the second sampling rate being different from the first sampling rate;

generating a reference arm adjustment signal based on a location indicator indicative of a location of the region along a propagation direction of the beam of light incident on the object during use of the swept-source OCT imaging system to acquire the first set of samples and the second set of samples for generating the OCT image data representing the image of the region of the object; and controlling the optical switch, based on the reference arm adjustment signal, to select an optical delay line of the plurality of optical delay lines to allow light to propagate in the reference arm using the selected optical delay line, such that a frequency of the interference light signal is below a cut-off frequency of the photodetector, thereby setting an optical delay between the light propagating along the reference arm and the light propagating along the sample arm.

2. The swept-source OCT imaging system according to claim 1, wherein the band-pass filter module comprises a tunable band-pass filter having a pass band with a tunable center frequency, and wherein the pass band of the band-pass filter module is set by adjusting the center frequency of the pass band based on a location indicator which is indicative of a location of the region along a propagation direction of the beam of light incident on the object during use of the swept-source OCT imaging system to acquire the first set of samples of the filtered electrical signal ($S_F$) for generating the OCT image data representing the image of the region of the object.

3. The swept-source OCT imaging system according to claim 1, wherein the band-pass filter module comprises a tunable band-pass filter having a pass band with a tunable bandwidth, and wherein the pass band of the bandpass filter module is set by adjusting the bandwidth of the pass band based on a range indicator indicative of a size of the region along a propagation direction of the beam of light.

4. The swept-source OCT imaging system according to claim 1, wherein the band-pass filter module comprises a plurality of non-tunable band-pass filters each having a different pass band, and wherein the pass band of the band-pass filter module is set by selecting a non-tunable band-pass filter from among the plurality of non-tunable band-pass filters to band-pass filter the electrical signal (S) to generate the filtered electrical signal ($S_F$), wherein the selecting is performed based on a location indicator which is indicative of a location of the region along a propagation direction of the beam of light incident on the object during use of the swept-source OCT imaging system to acquire the first set of samples of the filtered electrical signal ($S_F$).

5. The swept-source OCT imaging system according to claim 1, wherein the scanning element is arranged to scan the light beam generated by the swept light source by varying a scan angle of the scanning element, and the swept-source OCT imaging system further comprises:

an A-scan data generating module arranged to generate A-scan data of a plurality of A-scans by calculating an inverse Fourier transform of the samples of the filtered electrical signal ($S_F$) that have been acquired by the sample acquisition module for varying values of the scan angle, wherein each A-scan of the plurality of A-scans is based on samples of the filtered electrical signal ($S_F$) acquired by the sample acquisition module from a respective region of a plurality of regions in the object that have been imaged in the scan;

a tomographic data generating module arranged to generate tomographic data by arraying the A-scans to form an array of the A-scans, wherein A-scan elements of each A-scan in the array are arranged along a first direction (Y) of the array, and the A-scans are arrayed in a second direction (X) of the array, and wherein the tomographic data generating module is arranged, when generating the tomographic data, to offset by an offset amount each A-scan of the array along the first direction (Y) relative to other A-scans in the array, wherein the offset amount is based on a location indicator indicative of a location of the region along a propagation direction of the beam of light incident on the object during use of the swept-source OCT imaging system to acquire the first set of samples of the filtered electrical signal ($S_F$) for generating the OCT image data representing the image of the region of the object.

6. The swept-source OCT imaging system according to claim 1, wherein the swept-source OCT imaging system further comprises an A-scan data generating module arranged to generate A-scan data of an A-scan by:

calculating an inverse Fourier transform of the first set of samples to generate a first subset of the A-scan data; and calculating an inverse Fourier transform of the second set of samples to generate a second subset of the A-scan data, wherein the A-scan data generating module sample acquisition module comprises hardware.

7. The swept-source OCT imaging system according to claim 6, wherein the swept-source OCT imaging system further comprises a tomographic data generating module arranged to generate an A-scan by:

mapping data from the first subset of A-scan data to a first set of A-scan elements of the A-scan based on a location of the first sub-region along a propagation direction of the beam of light incident on the object during use of the swept-source OCT imaging system to acquire the first set of samples of the filtered electrical signal ($S_F$) for generating the OCT image data representing the image of the region of the object; and mapping data from the second subset of A-scan data to a second set of A-scan elements of the A-scan based on a location of the second sub-region along the propagation direction of the beam of light, wherein the tomographic data generating module comprises hardware.

8. The swept-source OCT imaging system according to claim 1, wherein:

the pass band of the band-pass filter module and the sampling rate of the sample acquisition module are set based on a location of the first sub-region along a propagation direction of the beam of light incident on the object during use of the swept-source OCT imaging system to acquire the first set of samples of the filtered electrical signal ($S_F$) for generating the OCT image data representing the image of the region of the object; and the pass band of the filter module and the second sampling rate of the second sample acquisition module are set based on a location of the second sub-region along the propagation direction of the beam of light.

9. The swept-source OCT imaging system according to claim 1, wherein the filter module comprises a second tunable filter having a pass band with a tunable center frequency, and wherein the set of operations further comprises:

adjusting the center frequency of the pass band of the second tunable filter based on a location of the second sub-region along a propagation direction of the beam of light incident on the object during use of the swept-source OCT imaging system to acquire the second set of samples of the filtered electrical signal ($S_F$).

10. The swept-source OCT imaging system according to claim 9, wherein the second tunable filter has a tunable bandwidth, and the set of operations further comprises:

adjusting the bandwidth of the second tunable filter based on a range indicator indicative of a size of the second sub-region along the propagation direction of the beam of light.

11. The swept-source OCT imaging system according to claim 1, wherein the filter module comprises a second plurality of non-tunable band-pass filters having pass bands with different center frequencies, and wherein setting the pass band of the filter module comprises selecting a non-tunable band-pass filter from among the second plurality of non-tunable band-pass filters, wherein the selecting is performed based on a location indicator which is indicative of a location of the second sub-region along a propagation direction of the beam of light incident on the object during use of the swept-source OCT imaging system to acquire the second set of samples.

12. The swept-source OCT imaging system according to claim 1, wherein the object is an eye, and the scanning element is arranged to generate the beam of light across the eye.

13. The swept-source OCT imaging system according to claim 1, wherein the object is an eye, and wherein:

the scanning element is arranged to scan the beam of light generated by the swept light source by varying a scan angle of the scanning element; and the set of operations comprises adjusting the pass band of the band-pass filter module and the sampling rate of the sample acquisition module using a predetermined variation of the pass band and the sampling rate with the scan angle, such that the sample acquisition module acquires samples from multiple regions of the eye along a scan direction of the scan for forming an image of a cross-section of a retina that is of substantially constant thickness from a surface of the retina.

14. A swept-source optical coherence tomography (OCT) imaging system for imaging a region of an object, comprising:

a swept light source arranged to generate a beam of light of a wavelength which varies over time;

a scanning element arranged to scan the beam of light across the object;

an interferometer having a sample arm and a reference arm, and arranged to generate an interference light signal during use of the swept-source OCT imaging system by combining light scattered by the region of the object and propagating along the sample arm, as a result of the beam being scanned across the object, with light from the beam propagating along the reference arm, wherein the reference arm comprises a plurality of optical delay lines, each optical delay line having a different optical path length;

an optical switch arranged to switchably allow light to propagate using one of the plurality of optical delay lines;

a photodetector arranged to receive the interference light signal and generate an electrical signal (S) that is indicative of the interference light signal, the electrical signal (S) comprising frequency components spanning a frequency band, the frequency components being caused by interference of the light scattered by the region of the object and propagating along the sample arm, with the light from the beam propagating along the reference arm;

a band-pass filter module arranged to generate a filtered electrical signal ($S_F$) by band-pass filtering the electrical signal (S), wherein the band-pass filter module comprises at least one of (a) a tunable band-pass filter or (b) a plurality of non-tunable bandpass filters;

a sample acquisition module arranged to acquire a first set of samples of the filtered electrical signal ($S_F$);

a filter module arranged to generate a second filtered electrical signal ($S_{F2}$) by filtering the electrical signal (S);

a second sample acquisition module arranged to acquire a second set of samples of the second filtered electrical signal ($S_{F2}$);

at least one processor; and memory storing instructions that, when executed by the at least one processor, cause the OCT imaging system to perform a set of operations, the set of operations comprising:

providing a first signal to the band-pass filter module to set a pass band of the band-pass filter module such that the band-pass filter module extracts at least some of the frequency components of the electrical signal (S) in a first sub-band of the frequency band and substantially attenuates frequency components of the electrical signal (S) outside the first sub-band;

providing a second signal to the sample acquisition module to set a sampling rate of the sample acquisition module such that the sample acquisition module band-pass samples the filtered electrical signal ($S_F$) to acquire the first set of samples of the filtered electrical signal ($S_F$) in the first sub-band of the frequency band, the first sub-band corresponding to a first sub-region of the region of the object, for generating OCT image data representing an image of the region of the object, such that (a) the first set of samples is acquired by the sample acquisition module in accordance with a bandpass sampling theorem, and (b) the filtered electrical signal ($S_F$) is frequency-translated into a first Nyquist zone without overlapping with spectral images of the filtered electrical signal ($S_F$) that are caused by sampling, thereby enabling aliasing to be substantially avoided and further enabling a depth of the region corresponding to the acquired set of samples to be deeper than would otherwise be attainable by the swept-source OCT imaging system owing to a limited maximum sampling rate of the sample acquisition module;

providing a third signal to the filter model to set a pass band of the filter module to extract frequency components of the electrical signal in a second sub-band of the frequency band that partially overlaps the first sub-band, wherein the second sub-band corresponds to a second sub-region of the region, and wherein partial overlap between the first sub-band and the second sub-band corresponds to an overlapping region between the first sub-region and the second sub-region;

providing a fourth signal to the second sample acquisition module to set a second sampling rate to acquire the second set of samples in the second sub-band using the second sampling rate, the second sampling rate being different from the first sampling rate;

generating a reference arm adjustment signal based on a location indicator indicative of a location of the region along a propagation direction of the beam of light incident on the object during use of the swept-source OCT imaging system to acquire the first set of samples and the second set of samples for generating the OCT image data representing the image of the region of the object; and controlling the optical switch, based on the reference arm adjustment signal, to select an optical delay line of the plurality of optical delay lines to allow light to propagate in the reference arm using the selected optical delay line, such that a frequency of the interference light signal is below a cut-off frequency of the photodetector, thereby setting an optical delay between the light propagating along the reference arm and the light propagating along the sample arm.

15. The swept-source OCT imaging system according to claim 14, wherein the band-pass filter module comprises a tunable band-pass filter having a pass band with a tunable center frequency, and wherein the pass band of the band-pass filter module is set by adjusting the center frequency of the pass band based on a location indicator which is indicative of a location of the region along a propagation direction of the beam of light incident on the object during use of the swept-source OCT imaging system to acquire the first set of samples of the filtered electrical signal ($S_F$) for generating the OCT image data representing the image of the region of the object.

16. The swept-source OCT imaging system according to claim 14, wherein the band-pass filter module comprises a tunable band-pass filter having a pass band with a tunable bandwidth, and wherein the pass band of the bandpass filter module is set by adjusting the bandwidth of the pass band based on a range indicator indicative of a size of the region along a propagation direction of the beam of light.

17. The swept-source OCT imaging system according to claim 14, wherein the band-pass filter module comprises a plurality of non-tunable band-pass filters each having a different pass band, and wherein the pass band of the band-pass filter module is set by selecting a non-tunable band-pass filter from among the plurality of non-tunable band-pass filters to band-pass filter the electrical signal (S) to generate the filtered electrical signal ($S_F$), wherein the selecting is performed based on a location indicator which is indicative of a location of the region along a propagation direction of the beam of light incident on the object during use of the swept-source OCT imaging system to acquire the first set of samples of the filtered electrical signal ($S_F$).

18. The swept-source OCT imaging system according to claim 14, wherein the scanning element is arranged to scan the light beam generated by the swept light source by varying a scan angle of the scanning element.

19. The swept-source OCT imaging system according to claim 18, further comprising:

an A-scan data generating module arranged to generate A-scan data of a plurality of A-scans by calculating an inverse Fourier transform of the samples of the filtered electrical signal ($S_F$) that have been acquired by the sample acquisition module for varying values of the scan angle, wherein each A-scan of the plurality of A-scans is based on samples of the filtered electrical signal ($S_F$) acquired by the sample acquisition module from a respective region of a plurality of regions in the object that have been imaged in the scan;

a tomographic data generating module arranged to generate tomographic data by arraying the A-scans to form an array of the A-scans, wherein A-scan elements of each A-scan in the array are arranged along a first direction (Y) of the array, and the A-scans are arrayed in a second direction (X) of the array, and wherein the tomographic data generating module is arranged, when generating the tomographic data, to offset by an offset amount each A-scan of the array along the first direction (Y) relative to other A-scans in the array, wherein the offset amount is based on a location indicator indicative of a location of the region along a propagation direction of the beam of light incident on the object during use of the swept-source OCT imaging system to acquire the first set of samples of the filtered electrical signal ($S_F$) for generating the OCT image data representing the image of the region of the object.

20. The swept-source OCT imaging system according to claim 17, wherein the filter module comprises a second plurality of non-tunable band-pass filters having pass bands with different center frequencies, and wherein setting the pass band of the filter module comprises selecting a non-tunable band-pass filter from among the second plurality of non-tunable band-pass filters, wherein the selecting is performed based on a location indicator which is indicative of a location of the second sub-region along a propagation direction of the beam of light incident on the object during use of the swept-source OCT imaging system to acquire the second set of samples.

* * * * *